US011405112B2

(12) United States Patent
Wen et al.

(10) Patent No.: US 11,405,112 B2
(45) Date of Patent: Aug. 2, 2022

(54) WAVELENGTH DIVISION MULTIPLEXED OPTICAL PARAMETER DETECTION RECEIVER

(71) Applicant: Futurewei Technologies, Inc., Plano, TX (US)

(72) Inventors: Yangjing Wen, Cupertino, CA (US); Yu Sheng Bai, Los Altos Hills, CA (US); An Li, Santa Clara, CA (US); Yan Cui, Sunnyvale, CA (US)

(73) Assignee: Futurewei Technologies, Inc., Addison, TX (US)

( * ) Notice: Subject to any disclaimer, the term of this patent is extended or adjusted under 35 U.S.C. 154(b) by 346 days.

(21) Appl. No.: 15/856,803

(22) Filed: Dec. 28, 2017

(65) Prior Publication Data

US 2019/0207682 A1 Jul. 4, 2019

(51) Int. Cl.
*H04B 10/61* (2013.01)
*H04J 14/06* (2006.01)
*H04B 10/27* (2013.01)
*H04J 14/02* (2006.01)

(52) U.S. Cl.
CPC .......... *H04B 10/614* (2013.01); *H04B 10/27* (2013.01); *H04J 14/0227* (2013.01); *H04J 14/06* (2013.01)

(58) Field of Classification Search
None
See application file for complete search history.

(56) References Cited

U.S. PATENT DOCUMENTS 7,436,569 B2 10/2008 Yao et al.
2002/0126347 A1* 9/2002 Hogan ............... G02B 6/12011
398/34

(Continued)

FOREIGN PATENT DOCUMENTS

CN 101686084 A 3/2010
CN 101795159 A 8/2010

(Continued)

OTHER PUBLICATIONS

Machine Translation and Abstract of Chinese Publication No. CN101795159, Aug. 4, 2010, 11 pages.

(Continued)

*Primary Examiner* — Darren E Wolf
(74) *Attorney, Agent, or Firm* — Conley Rose, P.C.

(57) ABSTRACT

A method comprising: receiving a multiplexed optical signal comprising optical channels for N wavelengths, N being a positive integer greater than or equal to two; and separating the multiplexed optical signal into a first multiplexed light and a second multiplexed light, each of the first multiplexed light and the second multiplexed light having the same polarization, and each of the first multiplexed light and the second multiplexed light having N wavelengths; separating the first multiplexed light into a plurality of first lights, each having a different wavelength; separating the second multiplexed light into a plurality of second lights simultaneous with separating the first multiplexed light into the first lights, each of the second lights having a different wavelength; and generating optical parameters for each optical channel in the N wavelengths using the first light and the second light for each wavelength.

20 Claims, 12 Drawing Sheets

(56) References Cited

U.S. PATENT DOCUMENTS

| | | | |
|---|---|---|---|
| 2003/0053171 A1* | 3/2003 | Baumann | G02B 6/12004 398/139 |
| 2004/0114939 A1 | 6/2004 | Taylor | |
| 2005/0185255 A1* | 8/2005 | Doerr | G01J 11/00 359/325 |
| 2009/0226129 A1* | 9/2009 | Kuipers | G02F 1/3132 385/14 |
| 2010/0322631 A1 | 12/2010 | Nagarajan et al. | |
| 2012/0008951 A1* | 1/2012 | Mikami | H04B 10/613 398/65 |
| 2013/0176554 A1* | 7/2013 | Loncar | B82Y 20/00 356/51 |
| 2014/0079390 A1* | 3/2014 | Kim | H04B 10/0773 398/30 |
| 2015/0229406 A1 | 8/2015 | Akiyama et al. | |
| 2016/0204894 A1 | 7/2016 | Dong et al. | |
| 2017/0279539 A1 | 9/2017 | Tanaka | |

FOREIGN PATENT DOCUMENTS

| | | |
|---|---|---|
| CN | 102483488 A | 5/2012 |
| CN | 104459881 A | 3/2015 |
| CN | 104467981 A | 3/2015 |
| CN | 104868969 A | 8/2015 |
| CN | 105278040 A | 1/2016 |
| CN | 106959167 A | 7/2017 |
| EP | 1139147 A2 | 10/2001 |
| WO | 2011005596 A2 | 1/2011 |
| WO | 2014121907 A1 | 8/2014 |

OTHER PUBLICATIONS

Foreign Communication From A Counterpart Application, PCT Application No. PCT/CN2018/122582, English Translation of International Search Report dated Mar. 22, 2019, 5 pages.

Foreign Communication From A Counterpart Application, PCT Application No. PCT/CN2018/122582, English Translation of Written Opinion dated Mar. 22, 2019, 4 pages.

Che, et al., "160-GB/s Stokes Vector Direct Detection for Short Reach Optical Communication," Optical Fiber Communications Conference and Exhibition (OFC), 2014, Paper Th5C7.pdf, Mar. 2014, 3 pages.

Dai, et al., "Passive Technologies for Future Large-Scale Photonic Integrated Circuits on Silicon: Polarization Handling, Light Non-Reciprocity and Loss Reduction," Light: Science & Applications (2012), e1: doi: 10.1038/lsa.2012.1, www.nature.com/lsa, Published online Mar. 29, 2012, 12 pages.

* cited by examiner

WAVELENGTH DIVISION MULTIPLEXED OPTICAL PARAMETER DETECTION RECEIVER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As the symbol rate for optical networks increases to meet the rising demand for bandwidth, optical transmission systems become more susceptible to link impairments, particularly fiber chromatic dispersion. Coherent detection can be used to address this problem and retain the phase information of optical signals. However, coherent detection is often not a cost-effective solution due to the requirement of a local oscillator (LO) and a power-hungry digital signal processor (DSP), both of which are expensive components.

Another solution is to use intensity modulation direct detection (IMDD) with double sideband (DSB), which is easy to implement, is relatively inexpensive, and has low power requirements. Unfortunately, IMDD with DSB cannot recover the phase information and cannot effectively perform dispersion compensation in the electric domain.

Yet another solution is to use direct detection of a single sideband (SSB) with the optical carrier. In such a case, the signal is self-homodyned to the carrier through the square-law detection process, and the optical phase information of the transmitted signal is preserved by translating it directly into electrical phase information. In this solution, the optical carrier to signal power ratio (CSPR) should be sufficiently large to avoid the signal beating induced interference. Under this condition, the power is mostly contained in the optical carrier, which makes the system power inefficient and exhibits a high required optical signal to noise ratio (ROSNR).

Thus, none of the existing solutions for increasing optical bandwidth address the needs of high efficiency, low ROSNR, low power usage, and low implementation cost. As such, there is a need for an improved method for increasing the bandwidth of an optical network.

SUMMARY

In one aspect, the disclosure includes a method comprising: receiving a multiplexed optical signal comprising optical channels for N wavelengths, N being a positive integer greater than or equal to two; and separating the multiplexed optical signal into a first multiplexed light and a second multiplexed light, each of the first multiplexed light and the second multiplexed light having the same polarization, and each of the first multiplexed light and the second multiplexed light having N wavelengths; separating the first multiplexed light into a plurality of first lights, each having a different wavelength; separating the second multiplexed light into a plurality of second lights simultaneously with separating the first multiplexed light into the first lights, each of the second lights having a different wavelength; and generating optical parameters for each optical channel in the N wavelengths using the first light and the second light for each wavelength. In the above embodiment or any other embodiment, generating the optical parameters for each optical channel in the N wavelengths using the first light and the second light for each wavelength comprises: splitting the first light into a first light first part and a first light second part for each wavelength; splitting the second light into a second light first part and a second light second part for each wavelength; generating a first one of the optical parameters using the first light first part and the second light first part for each wavelength; passing the first light second part and the second light second part through a 90° optical hybrid; and generating a second one of the optical parameters and a third one of the optical parameters for each optical channel in the N wavelengths using outputs of the 90° optical hybrid. In the above embodiment or any other embodiment, the second one of the optical parameters and the third one of the optical parameters for each optical channel in the N wavelengths is generated simultaneous with generating the first one of the optical parameters. In the above embodiment or any other embodiment, generating the optical parameters for each optical channel in the N wavelengths using the first light and the second light for each wavelength comprises: splitting the first light into a first light first part, a first light second part, and a first light third part for each wavelength; splitting the second light into a second light first part, a second light second part, and a second light third part for each wavelength; generating a first one of the optical parameters using the first light first part and the second light first part for each wavelength; phase shifting the second light second part; combining the first light second part and the phase shifted second light second part; generating a second one of the optical parameters for each optical channel in the N wavelengths using the combination of the first light second part and the phase shifted second light second part; combining the first light third part and the second light third part; and generating a third one of the optical parameters for each optical channel in the N wavelengths using the combination of the first light third part and the second light third part. In the above embodiment or any other embodiment, the second one of the optical parameters and the third one of the optical parameters for each optical channel in the N wavelengths is generated simultaneous with generating the first one of the optical parameters. In the above embodiment or any other embodiment, phase shifting the second light second part comprises phase shifting the second light second part −90°. In the above embodiment or any other embodiment, the optical parameters are Stokes parameters S1, S2, and S3.

In a second aspect, the disclosure includes an apparatus comprising: a polarization splitter and rotator (PSR) configured to: receive a multiplexed optical signal comprising optical channels for N wavelengths, N being a positive integer greater than or equal to two; and separate the multiplexed optical signal into a first multiplexed light and a second multiplexed light, each of the first multiplexed light and the second multiplexed light having the same polarization and each of the first multiplexed light and the second multiplexed light having N wavelengths; a first wavelength separator coupled to the PSR and configured to separate the first multiplexed light into the N separate first lights each having a different wavelength; a second wavelength separator coupled to the PSR in parallel with the first wavelength separator, the second wavelength separator configured to separate the second multiplexed light into the N separate second lights each having a different wavelength; and N optical parameter generators configured in parallel to the first wavelength separator and the second wavelength separator and configured to generate optical parameters for the optical channels for the N wavelengths. In the above embodiment or any other embodiment, the PSR, the first wavelength separator, the second wavelength separator, and the N optical parameter generators are all based on waveguides and integrated onto a single optical chip. In the above embodiment or any other embodiment, the PSR receives the multiplexed optical signal at a PSR input port, the N optical parameter generators each comprise at least one balanced photodetector (BPD) comprising a BPD input port for the first light at each wavelength and a BPD input port for the second light at each wavelength, and a difference in a first light travel time between a time it take the first light to travel from the PSR input port to the BPD input port for the first light and a time it take the second light to travel from the PSR input port to the BPD input port for the second light is no more than 2 picoseconds. In the above embodiment or any other embodiment, the N optical parameter generators each comprise: a first optical splitter coupled to the first wavelength separator and the second wavelength separator; a second optical splitter coupled to the first wavelength separator and the second wavelength separator; a first BPD coupled to the first optical splitter and the second optical splitter; a 90° optical hybrid coupled to the first optical splitter and the second optical splitter; a second BPD coupled to the 90° optical hybrid; and a third BPD coupled to the 90° optical hybrid, and wherein the first BPD, the second BPD, and the third BPD are configured to simultaneously generate the optical parameters for the optical channels for the N wavelengths. In the above embodiment or any other embodiment, the optical parameters are Stokes parameters S1, S2, and S3. In the above embodiment or any other embodiment, the N optical parameter generators each comprise: a first optical splitter coupled to the first wavelength separator and the second wavelength separator; a second optical splitter coupled to the first wavelength separator and the second wavelength separator; a first BPD coupled to the first optical splitter and the second optical splitter; a phase shifter coupled to the second optical splitter; a first optical coupler coupled to the first optical splitter and the phase shifter; a second optical coupler coupled to the first optical splitter and the second optical splitter; a second BPD coupled to the first optical coupler; and a third BPD coupled to the second optical coupler, and wherein the first BPD, the second BPD, and the third BPD are configured to simultaneously generate the optical parameters for the optical channels for the N wavelengths. In the above embodiment or any other embodiment, the optical parameters are Stokes parameters S1, S2, and S3.

In a third aspect, the disclosure includes an apparatus comprising: a PSR comprising a PSR input port configured to receive a multiplexed optical signal at a PSR input port, the multiplexed optical signal comprising optical channels for N wavelengths, and N being a positive integer greater than or equal to two; a first wavelength separator coupled to the PSR; a second wavelength separator coupled to the PSR in parallel with the first wavelength separator; and a first optical parameter generator coupled to the first wavelength separator and the second wavelength separator and configured to generate optical parameters for a first wavelength, the first optical parameter generator comprising at least one BPD comprising a BPD input port for a first light and a BPD input port for a second light, wherein a difference in a first light travel time between a time it take the first light to travel from the PSR input port to the BPD input port for the first light and a time it take the second light to travel from the PSR input port to the BPD input port for the second light is no more than 2 picoseconds. In the above embodiment or any other embodiment, the PSR, the first wavelength separator, the second wavelength separator, and the N optical parameter generators are all based on waveguides and integrated onto a single optical chip. In the above embodiment or any other embodiment, the first optical parameter generator comprises: a first optical splitter coupled to the first wavelength separator and the second wavelength separator; a second optical splitter coupled to the first wavelength separator and the second wavelength separator; a first BPD coupled to the first optical splitter and the second optical splitter; a 90° optical hybrid coupled to the first optical splitter and the second optical splitter; a second BPD coupled to the 90° optical hybrid; and a third BPD coupled to the 90° optical hybrid, and wherein the first BPD, the second BPD, and the third BPD are configured to simultaneously generate the optical parameters for the optical channel for the first wavelength. In the above embodiment or any other embodiment, the first optical parameter generator comprises: a first optical splitter coupled to the first wavelength separator and the second wavelength separator; a second optical splitter coupled to the first wavelength separator and the second wavelength separator; a first BPD coupled to the first optical splitter and the second optical splitter; a phase shifter coupled to the second optical splitter; a first optical coupler coupled to the first optical splitter and the phase shifter; a second optical coupler coupled to the first optical splitter and the second optical splitter; a second BPD coupled to the first optical coupler; and a third BPD coupled to the second optical coupler, and wherein the first BPD, the second BPD, and the third BPD are configured to simultaneously generate the optical parameters for the optical channels for the N wavelengths. In the above embodiment or any other embodiment, the wavelength separators comprise an arrayed waveguide grating, a micro-ring resonators, or a Mach-Zehnder interferometer. In the above embodiment or any other embodiment, the optical parameters are Stokes parameters.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus comprising an optical parameter detection receiver that meets the needs identified above without suffering the disadvantages in the prior art. The optical parameter detection receiver is configured to detect various optical parameters for an optical vector, such as the Stokes parameters (S1, S2, and S3) for the Stokes vector or the Jones parameters ($E_{0x}e^{i\Phi x}$ and $E_{0y}e^{i\Phi y}$) for the Jones vector. Specifically, the optical parameter detection receiver is configured to receive a multiplexed optical signal comprising different polarizations and different wavelengths, separate the multiplexed optical signal into two multiplexed lights having the same polarizations (e.g. traverse electric (TE) or transverse magnetic (TM)), demultiplex each of the two multiplexed lights into their constituent wavelengths, and forward the lights to OPGs that generate the optical parameters for each wavelength (e.g. the Stokes parameters). As such, the optical parameter detection receiver processes the optical channels for each wavelength in parallel and simultaneously. In addition, the optical parameter detection receiver can be designed such that the path length for each wavelength across the optical parameter detection receiver is substantially identical in length and/or has a substantially identical optical transmission time. When the optical parameters are Stokes parameters, the optical parameter detection receiver can perform chromatic dispersion compensation in the DSP at the receiver side, and is tolerant to phase noise since S1 is independent of phase noise and the arithmetic difference of S2 and S3 is free of phase noise because the phases of X and Y polarizations are both corrupted by the same phase noise of the laser in the transmitter. The disclosed optical parameter detection receiver is advantageous in that it does not utilize coherent detection (and thus does not require a LO) and can be used to recover signal phase information. Thus, the disclosed optical parameter detection has performance, cost, and power consumption between those of IMDD and coherent detection.

Figure 1:
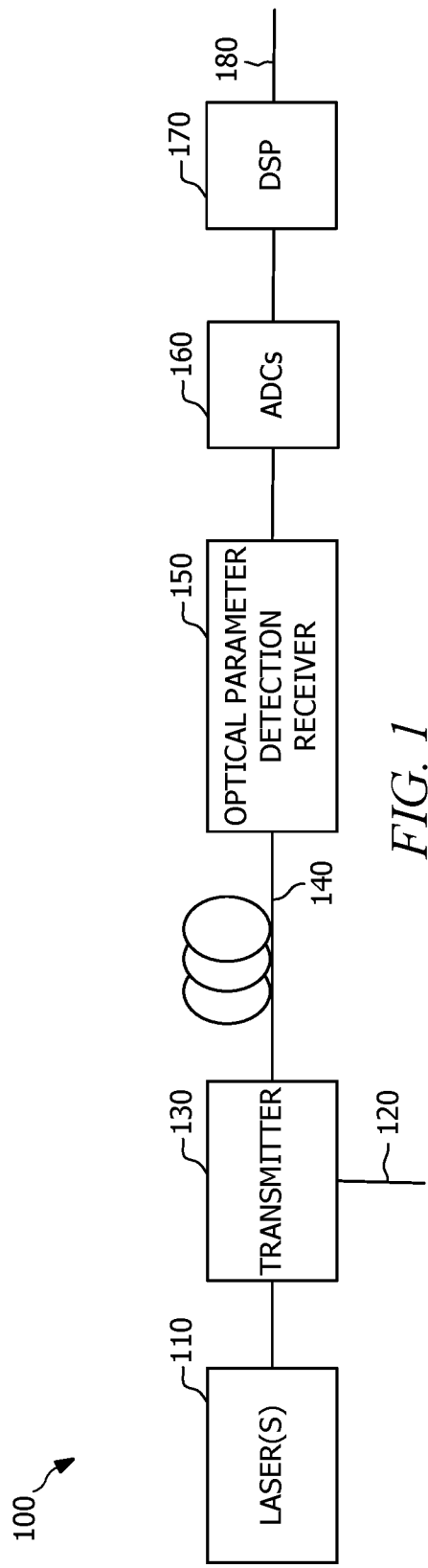
FIG. 1 illustrates an optical network that uses an optical parameter detection receiver in an embodiment.

FIG. 1 illustrates an embodiment of the optical network 100 that uses an optical parameter detection receiver. Generally, the optical network 100 will be a short reach (e.g. 2-300 kilometer) optical network, such as a metro network, a data center, or a passive optical network (PON). However, in an embodiment the optical network 100 may be any type of optical network where coherent detection is not desired. On the transmitter side, the optical network 100 comprises at least one laser 110, for example a continuous wave laser. There may be one laser 110 for each wavelength used in the optical network 100, or a single laser 110 may provide a broad comb of wavelengths that are used in the optical network 100. In addition, any or all of the lasers 110 may contain polarization filters or other devices that polarize some or all of the individual wavelengths emitted by the lasers 110.

The various wavelengths from the laser(s) 110 are fed to the transmitter 130, which may comprise a modulator. The transmitter 130 receives electrical signals 120 (e.g. one electrical signal 120 for every optical signal used in the optical network 100), and modulates each wavelength to produce an optical channel (e.g. a Stokes vector channel). A typical optical channel consists of a data signal having a first polarization (e.g. TE) and a carrier signal having a second polarization orthogonal to the first polarization (e.g. TM), where both the data signal and the carrier signal are at the same wavelength. If the wavelengths received by the transmitter 130 are already polarized, the transmitter 130 modulates each combination of wavelength and polarization. If the wavelengths received by the transmitter 130 are not already polarized, the transmitter 130 can separate each wavelength into its individual polarizations (e.g. TE and TM), and modulate each combination of wavelength and polarization. The various optical channels are then combined into a multiplexed optical signal and transmitted across the optical fiber 140.

On the receiver side, the optical parameter detection receiver 150 receives the multiplexed optical signal, separates the multiplexed optical signal into two multiplexed lights having the same polarizations (e.g. TE or TM), demultiplexer each of the two multiplexed lights into their constituent wavelengths, and forwards the lights to OPGs that generate the optical parameters for each wavelength (as is explained in more detail below). The optical parameters for each wavelength are sent to an analog to digital converter (ADC) 160, which converts the analog optical parameters into digital signals. The digital signals are then processed by a DSP 170, which generates electrical signals 180 that are identical or at least substantially similar to the electrical signals 120.

Figure 2:
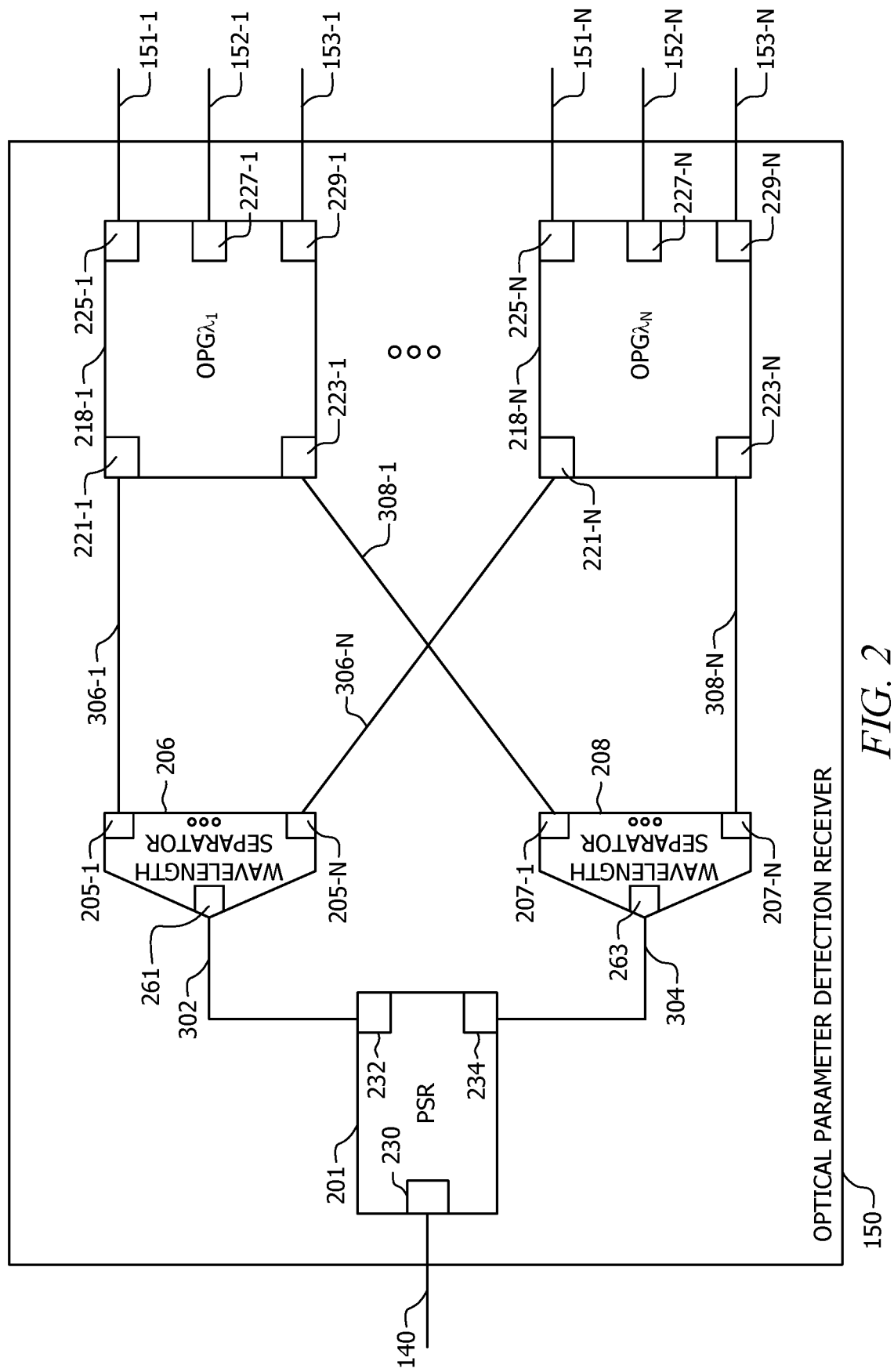
FIG. 2 illustrates a optical parameter detection receiver in an embodiment.

FIG. 2 illustrates one embodiment of the optical parameter detection receiver 150. The optical parameter detection receiver 150 comprises a PSR 201, a first wavelength separator 206, a second wavelength separator 208 (configured in parallel with the first wavelength separator 206), and an OPG 218 (e.g. 218-1-218-N) for each wavelength 1-N (where N is a positive integer greater or equal to two) coupled together as shown in FIG. 2. As shown in FIG. 2, the various OPGs 218 are configured in parallel with one another. For the purposes of simplicity, FIG. 2 describes only two wavelengths (λ1 and λN), but it will be appreciated that the present disclose is not limited to such. In commercial applications, embodiments of the present disclosure will likely contain more than two (e.g. 4, 8, 16, 20, 32, 40, 64, 80, or some other number) wavelengths. In addition, it will be appreciated that the optical parameter detection receiver 150 is not limited to the architecture shown in FIG. 2, and in some embodiments will comprise one wavelength separator 206, 208 for each polarization separated by the PSR 201. In addition, it will be appreciated that the optical connections within the optical parameter detection receiver 150 may be optical fibers, optical waveguides, air, any other suitable optical transmission media, or combinations thereof.

Figure 4:
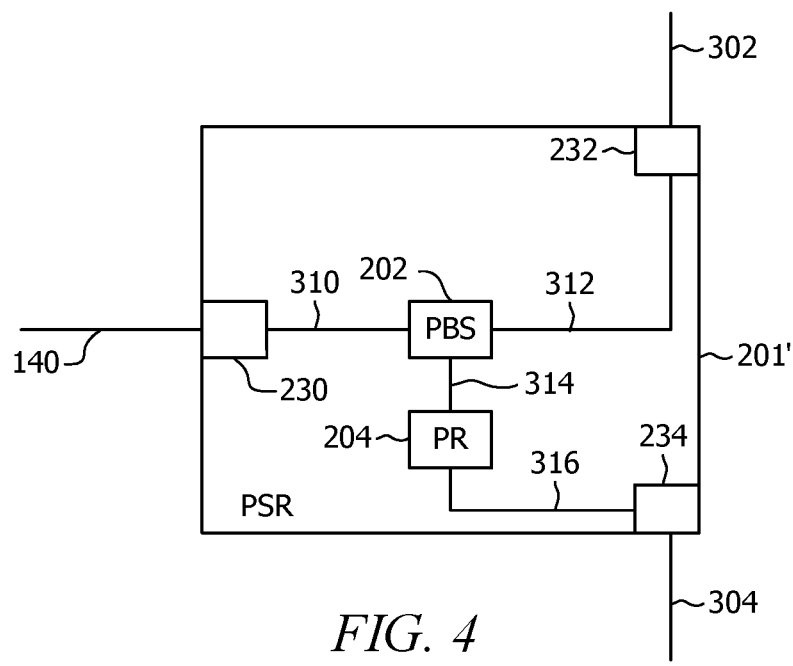
FIG. 4 illustrates a PSR in an embodiment.
Figure 5:
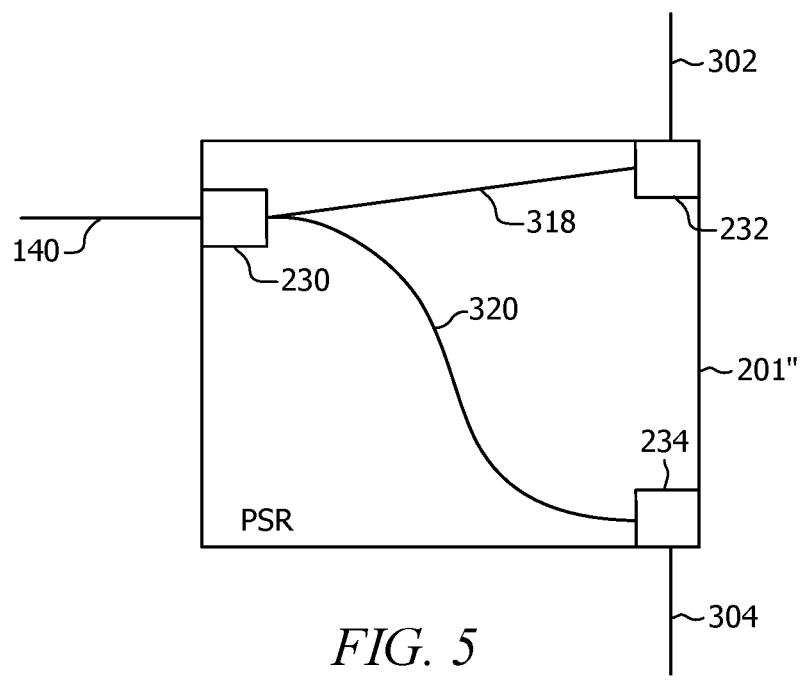
FIG. 5 illustrates the PSR in another embodiment.

The PSR 201 is any component configured to separate a multiplexed optical signal into two different multiplexed lights (referred to as $E_x$ and $E_y$) having the same polarization (e.g. TE or TM). Generally, the PSR 201 accomplishes such by implementing two separate functions: polarization splitting and adjustment (e.g. rotation) of one polarization to match the other polarization. If the PSR 201 can completely separate the two polarizations in the multiplexed optical signal, then the first multiplexed light $E_x$ will contain one polarization (e.g. the data signal) for each wavelength in the multiplexed optical signal, and the second multiplexed light $E_y$ will contain the other polarization (e.g. the carrier signal) for each wavelength in the multiplexed optical signal. More often, however, the PSR 201 cannot completely separate the two polarizations in the multiplexed optical signal, and as such each of the first multiplexed light $E_x$ and the second multiplexed light $E_y$ contain some combination of the two polarizations in the multiplexed optical signal. As shown in FIG. 2, the PSR 201 comprises a PSR input port 230 configured to receive the multiplexed optical signal on fiber 140. The PSR 201 also comprises two PSR output ports 232, 234, where the PSR output port 232 outputs a first multiplexed light $E_x$ on path 302 and the PSR output port 234 outputs a second multiplexed light $E_y$ on path 304. Various examples of the PSR 201 are shown in FIGS. 4 and 5 below.

Figure 6:
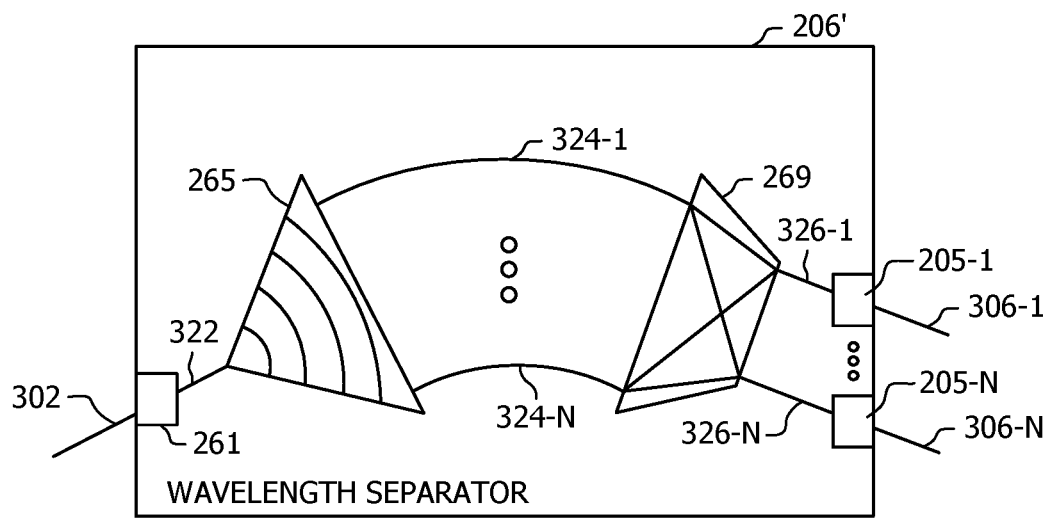
FIG. 6 illustrates a wavelength separator in an embodiment.
Figure 7:
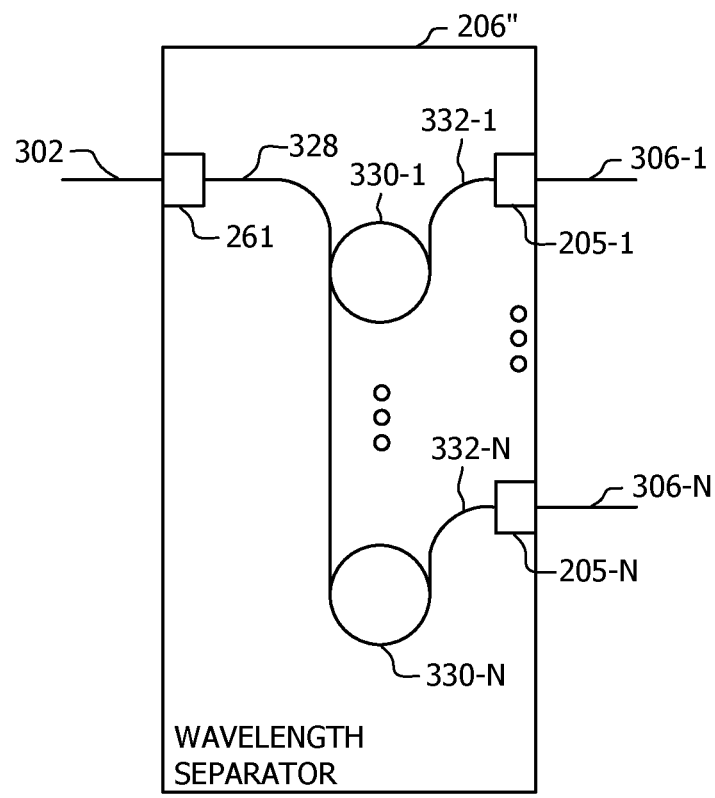
FIG. 7 illustrates the wavelength separator in another embodiment.
Figure 8:
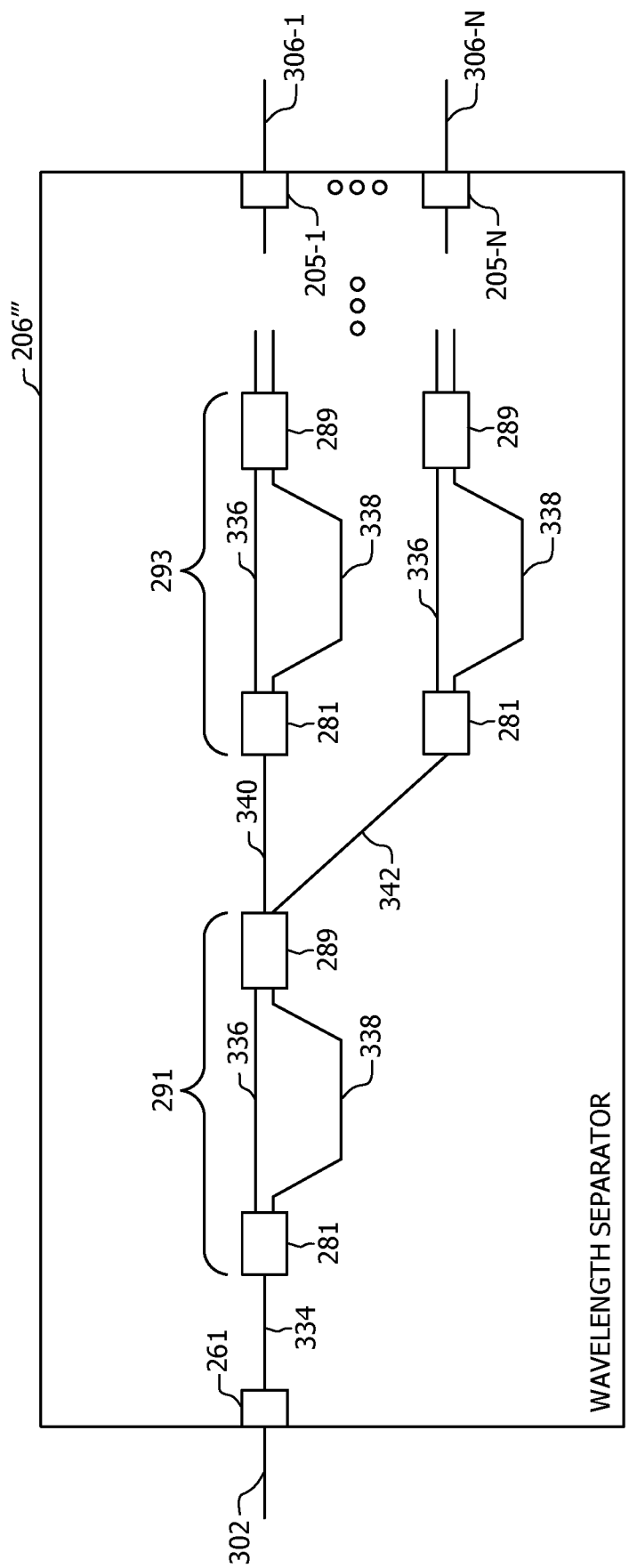
FIG. 8 illustrates the wavelength separator in yet another embodiment.

The first wavelength separator 206 and the second wavelength separator 208 may each be any device suitable for separating the first multiplexed light $E_x$ and the second multiplexed light $E_y$ into different wavelengths. The first wavelength separator 206 is configured to receive the first multiplexed light $E_x$ at wavelength separator input port 261 and separate the multiplexed light $E_x$ into its various wavelengths, which results in light $E_{x\lambda 1}$ having wavelength $\lambda 1$ (which is output on path 306-1 via wavelength separator output port 205-1) through light $E_{x\lambda N}$ having wavelength (which is output on path 306-N via wavelength separator output port 205-N). Similarly, the second wavelength separator 208 is configured to receive the second light at wavelength separator input port 263 and separate the second multiplexed light $E_y$ into its various wavelengths, which results in light $E_{y\lambda 1}$ having wavelength $\lambda 1$ (which is output on path 308-1 via wavelength separator output port 207-1) through light $E_{y\lambda N}$ having wavelength $\lambda N$ (which is output on path 308-N via wavelength separator output port 207-N). Generally, the first wavelength separator 206 and the second wavelength separator 208 accomplish the wavelength separation function by passing the light through a plurality of paths of different lengths. Various configurations of the first wavelength separator 206 are shown in FIGS. 6-8 below. The second wavelength separator 208 may be the same configuration as or a different configuration than the first wavelength separator 206.

The OPGs 218 are any devices configured to convert the lights from the wavelength separators 206, 208 into optical parameters. Specifically, the OPG 218-1 is configured to receive the light $E_{x\lambda 1}$ on path 306-1 (via OPG input port 221-1) and the light $E_{y\lambda 1}$ on path 308-1 (via OPG input port 223-1) and generate at least one optical parameter (e.g. a first optical parameter output on path 151-1 via OPG output port 225-1, a second optical parameter output on path 152-1 via OPG output port 227-1, and a third optical parameter output on path 153-1 via OPG output port 229-1). A similar arrangement is provided for each OPG associated with one of the wavelengths in the multiplexed optical signal. For example, the OPG 218-N is configured to receive the light $E_{x\lambda N}$ on path 306-N (via OPG input port 221-N) and the light $E_{y\lambda N}$ on path 308-N (via OPG input port 223-N) and generate at least one optical parameter (e.g. a first optical parameter output on path 151-N via OPG output port 225-N, a second optical parameter output on path 152-N via OPG output port 227-N, and a third optical parameter output on path 153-N via OPG output port 229-N). In the case where the optical parameters are the Stokes parameters S1, S2, and S3, the optical parameter on path 151-1 is S1 for the first wavelength ($S1_{\lambda 1}$), the optical parameter on path 152-1 is S2 for the first wavelength ($S2_{\lambda 1}$), and the optical parameter on path 153-1 is S3 for the first wavelength ($S3_{\lambda 1}$). Similarly, when the optical parameters are Stokes parameters, the optical parameter on path 151-N is S1 for the $N^{th}$ wavelength ($S1_{\lambda N}$), the optical parameter on path 152-N is S2 for the $N^{th}$ wavelength ($S2_{\lambda N}$), and the optical parameter on path 153-N is S3 for the $N^{th}$ wavelength ($S3_{\lambda N}$).

It will be appreciated that the number of output ports/paths exiting the OPG 218 will depend on the desired number of optical parameters. It will be also appreciated that while only two OPGs 218 (218-1 and 218-N) are shown in FIG. 2, the optical parameter detection receiver 150 may comprise more than two OPGs 218. For example, the optical parameter detection receiver 150 may comprise N OPGs 218, where N is the number of wavelengths in the multiplexed optical signal, and is a positive integer greater than or equal to two.

Figure 3:
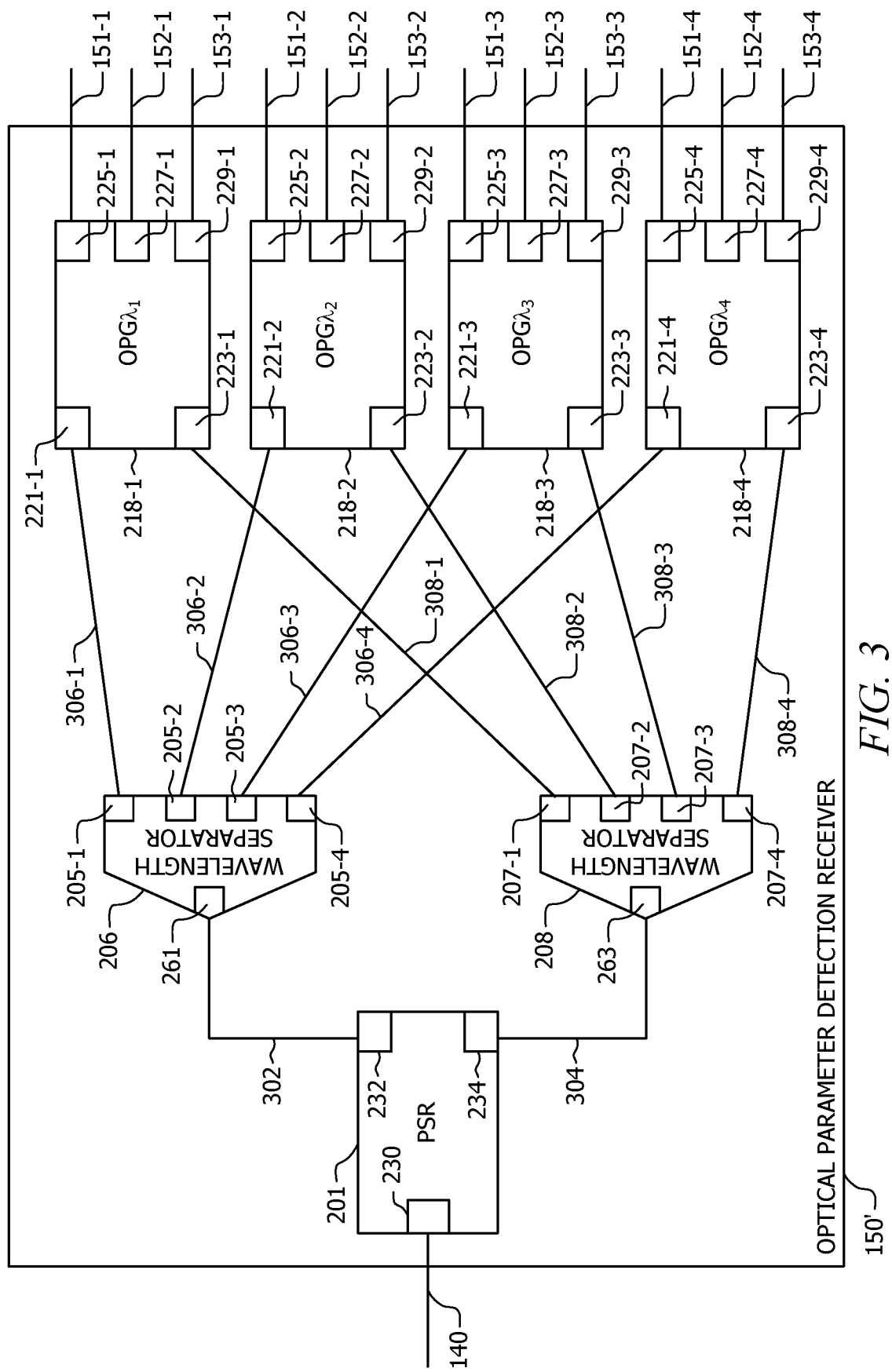
FIG. 3 illustrates the optical parameter detection receiver in another embodiment.

FIG. 3 is an example of an optical parameter detection receiver 150' for four wavelengths: $\lambda 1$, $\lambda 2$, $\lambda 3$, and $\lambda 4$ (i.e. N=4). The optical parameter detection receiver 150' comprises the PSR 201, the first wavelength separator 206, the second wavelength separator 208, and four OPGs 218-1, 218-2, 218-3, and 218-4 coupled together as shown in FIG. 3. The PSR 201 is the same as described above. The first wavelength separator 206 is configured to receive the first light at wavelength separator input port 261 and separate the first light $E_x$ into its four wavelengths: light $E_{x\lambda 1}$ having wavelength $\lambda 1$ (which is output on path 306-1 via wavelength separator output port 205-1), light $E_{x\lambda 2}$ having wavelength (which is output on path 306-2 via wavelength separator output port 205-2), light $E_{x\lambda 3}$ having wavelength (which is output on path 306-3 via wavelength separator output port 205-3), and light $E_{x\lambda 4}$ having wavelength $\lambda 4$ (which is output on path 306-4 via wavelength separator output port 205-4). The second wavelength separator 208 is configured to receive the second light at wavelength separator input port 263 and separate the second light $E_y$ into its four wavelengths: light $E_{y\lambda 1}$ having wavelength $\lambda 1$ (which is output on path 308-1 via wavelength separator output port 207-1), light $E_{y\lambda 2}$ having wavelength $\lambda 2$ (which is output on path 308-2 via wavelength separator output port 207-2), light $E_{y\lambda 3}$ having wavelength $\lambda 3$ (which is output on path 308-3 via wavelength separator output port 207-3), and light $E_{y\lambda 4}$ having wavelength $\lambda 4$ (which is output on path 308-4 via wavelength separator output port 207-4). The OPG 218-1 is the same as described above. The OPG 218-2 is configured to receive the light $E_{x\lambda 2}$ on path 306-2 (via OPG input port 221-2) and the light $E_{y\lambda 2}$ on path 308-2 (via OPG input port 223-2) and generate at least one optical parameter (e.g. a first optical parameter output on path 151-2 via OPG output port 225-2, a second optical parameter output on path 152-2 via OPG output port 227-2, and a third optical parameter output on path 153-2 via OPG output port 229-2). The OPG 218-3 is configured to receive the light $E_{x\lambda 3}$ on path 306-3 (via OPG input port 221-3) and the light $E_{y\lambda 3}$ on path 308-3 (via OPG input port 223-3) and generate at least one optical parameter (e.g. a first optical parameter output on path 151-3 via OPG output port 225-3, a second optical parameter output on path 152-3 via OPG output port 227-3, and a third optical parameter output on path 153-3 via OPG output port 229-3). The OPG 218-4 is configured to receive the light $E_{x\lambda 4}$ on path 306-4 (via OPG input port 221-4) and the light $E_{y\lambda 4}$ on path 308-4 (via OPG input port 223-4) and generate at least one optical parameter (e.g. a first optical parameter output on path 151-4 via OPG output port 225-4, a second optical parameter output on path 152-4 via OPG output port 227-4, and a third optical parameter output on path 153-4 via OPG output port 229-4). It will be appreciated that the architecture in FIG. 3 can be scaled up for any number of wavelengths by adding one wavelength separator output port 205, one wavelength separator output port 207, one path 306, one path 308, one OPG 218, one path 151, one path 152, and one path 153 for each wavelength.

FIG. 4 illustrates an embodiment of the PSR 201', which is a specific implementation of the PSR 201. The PSR 201' comprises the PSR input port 230, a polarization beam splitter (PBS) 202, a polarization rotator (PR) 204, the PSR output port 232, and the PSR output port 234 coupled together as shown in FIG. 4. The PSR input port 230 is configured to receive the multiplexed optical signal on optical fiber 140 and pass the multiplexed optical signal to PBS 202 via path 310. The PBS 202 is configured to separate the multiplexed optical signal into a first multiplexed light $E_x$ with first polarization (e.g. TE) and a second multiplexed light $E_y$ with second polarization (e.g. TM). The first multiplexed light $E_x$ is output on path 312 to the PSR output port 232 and then path 302. The second multiplexed light $E_y$ is output on path 314. The PR 204 is any device configured to adjust the polarization of the second multiplexed light $E_y$ to match the polarization of the first multiplexed light $E_x$. For example, the PR 204 may be configured to rotate the second light $E_y$ from path 314 90° such that the second light $E_y$ has the same polarization as the first light $E_x$ (e.g. TE). The second light $E_y$ is then output on path 316 to PSR output port 234 then path 304.

FIG. 5 illustrates an embodiment of the PSR 201'', which is a specific implementation of the PSR 201. The PSR 201'' comprises the PSR input port 230, waveguide 318, waveguide 320, the PSR output port 232, and the PSR output port 234 coupled together as shown in FIG. 5. The PSR input port 230 is configured to receive the multiplexed optical signal on optical fiber 140 and split the multiplexed optical signal to waveguides 318 and 320. The waveguide 318 is configured to filter the second light $E_y$ such that only the first light $E_x$ with first polarization (e.g. TE) reaches the PSR output port 232, which is then passed to path 302. Similarly, the waveguide 320 is configured to: (1) filter the first light $E_x$; and (2) rotate the second light $E_y$ such that the second light $E_y$ has the first polarization (e.g. TE) when it reaches the PSR output port 234, which is then passed to path 304.

FIG. 6 illustrates an example of the arrayed waveguide grating (AWG) embodiment of the wavelength separator 206', which is a specific implementation of the first wavelength separator 206. The first multiplexed light $E_x$ enters the wavelength separator 206' via path 302 at wavelength separator input port 261. The first light $E_x$ then passes along path 322 to a free propagation region 265 that allows the first light $E_x$ to enter a plurality of arrayed waveguides 324-1-324-N. 324-1-324-N The arrayed waveguides 324-1-324-N are curved and have different lengths, and thus apply a different phase shift at the exit of the arrayed waveguide 324-1-324-N. The first multiplexed light $E_x$ from each waveguide 324-1-324-N then traverses another free propagation region 269 and interferes at the entrance to paths 326-1-326-N in such a way that each of the paths 326-1-326-N receives only light of a certain wavelength. For example, path 326-1 receives the light $E_{x\lambda 1}$, which is passed to wavelength separator output port 205-1 then path 306-1, and path 326-N receives the light $E_{x\lambda N}$, which is passed to wavelength separator output port 205-N then path 306-N.

FIG. 7 illustrates an example of the micro-ring resonator embodiment of the wavelength separator 206'', which is a specific implementation of the first wavelength separator 206. The first light $E_x$ enters the wavelength separator 206'' via path 302 at wavelength separator input port 261. The first light $E_x$ then passes along path 328 to a plurality of ring resonators 330-1-330-N, where there is generally one ring resonator 330 for each wavelength. Each ring resonator 330 has a different diameter such that it resonates light at a specific wavelength. As the light of the resonant wavelength passes through the ring resonator 330, it builds up in intensity over multiple round-trips due to constructive interference and is output to its respective path 332. As a result, the light $E_{x\lambda 1}$ exits ring resonator 330-1 along path 332-1 and is output to wavelength separator output port 205-1 then path 306-1. Similarly, the light $E_{x\lambda N}$ exits ring resonator 330-N along path 332-N and is output to wavelength separator output port 205-N then path 306-N.

FIG. 8 illustrates an example of the Mach-Zehnder interferometers (MZI) embodiment of the wavelength separator 206''', which is a specific implementation of the first wavelength separator 206. The first light $E_x$ enters the wavelength separator 206''' via path 302 at wavelength separator input port 261. The first light $E_x$ then travels along path 334 to a MZI first stage 291, which comprises a splitter 281, paths 336, 338, and a coupler 289 arranged as shown in FIG. 8. The two paths 336, 338 have different lengths and may comprise Bragg gratings. The coupler 289 is configured such that when the light from the two paths 336, 338 is combined, the resulting interference creates a one half split among the wavelengths (i.e. half of the wavelengths exit on path 340 and half of the wavelengths exit on path 342). The MZI stages can be repeated (e.g. in second stage 293, etc.) as many times as needed to achieve the desired number of wavelength separations. Generally, there will be $\log_2 N$ stages for N wavelengths. The result is that the light $E_{x\lambda 1}$ exits the final MZI stage at wavelength separator output port 205-1 then path 306-1, and the light $E_{x\lambda N}$ exits the final MZI stage at wavelength separator output port 205-N then path 306-N.

Figure 9:
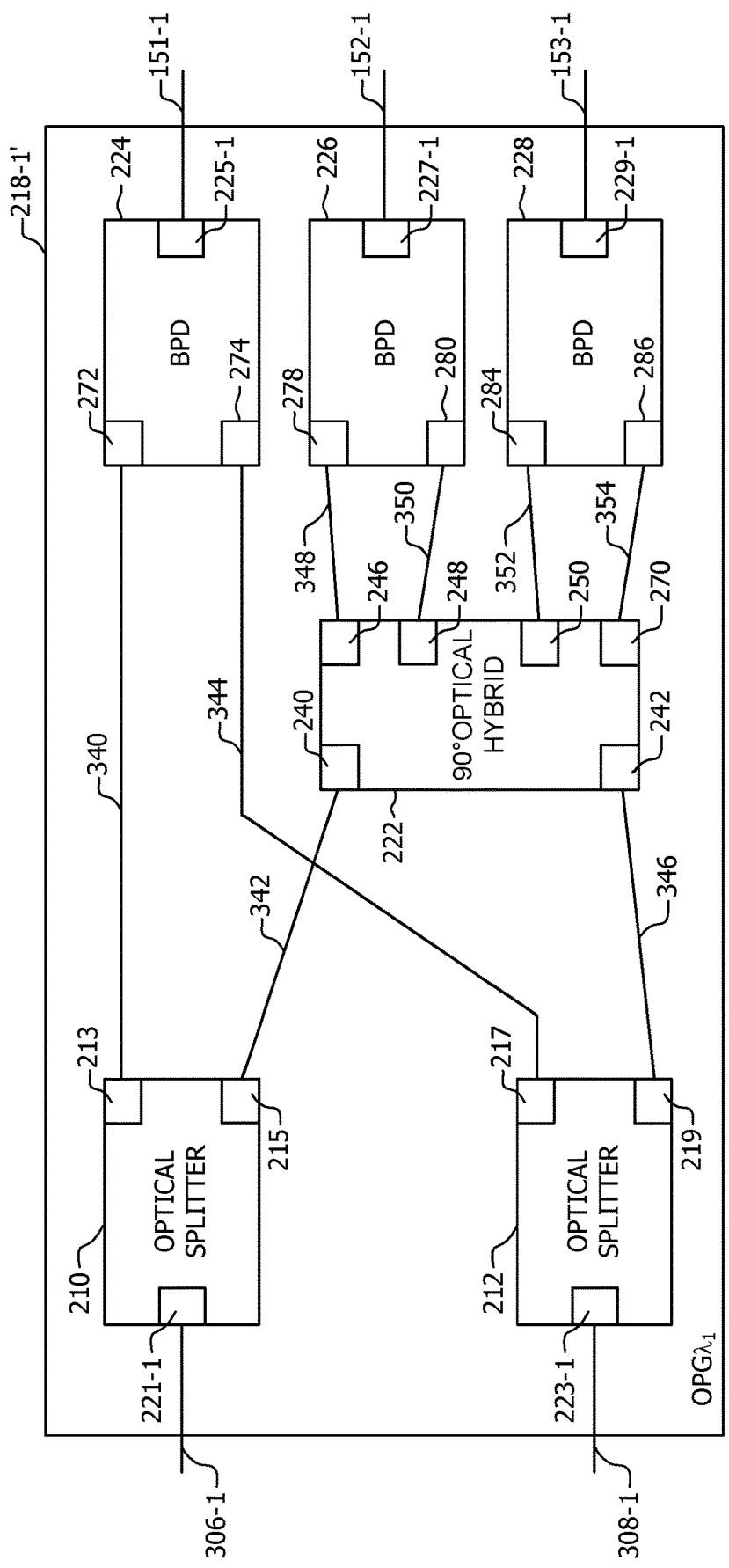
FIG. 9 illustrates an optical parameter generator (OPG) in an embodiment.

FIG. 9 illustrates one embodiment of an OPG 218-1', which is a specific implementation of the OPG 218-1. The OPG 218-1' may comprise a first optical splitter 210, a second optical splitter 212, a 90° optical hybrid 222, and BPDs 224, 226, 228 arranged as shown in FIG. 9. The first optical splitter 210 and the second optical splitter 212 may be any optical components configured to split a light into two separate but identical lights. For example, the first optical splitter 210 and the second optical splitter 212 may be 1:2 optical couplers or 2:2 optical couplers with one terminated input port. In either case, the first optical splitter 210 and the second optical splitter 212 may have an even coupling ratio. The first optical splitter 210 is configured to receive the light $E_{x\lambda 1}$ via path 306-1 at OPG input port 221-1 and split the into light $E_{x\lambda 1(1)}$, which is output on optical splitter output port 213 to path 340, and light $E_{x\lambda 1(2)}$, which is output on optical splitter output port 215 to path 342. Similarly, the second optical splitter 212 is configured to receive the light $E_{y\lambda 1}$ via path 308-1 at OPG input port 223-1 and split the into light $E_{y\lambda 1(1)}$, which is output on optical splitter output port 217 to path 344, and light $E_{y\lambda 1(2)}$, which is output on optical splitter output port 219 to path 346. The BPD 224 is configured receive the light $E_{x\lambda 1(1)}$ at BPD input port 272 and the light $E_{y\lambda 1(1)}$ at BPD input port 274 and generate the first optical parameter (e.g. $S1_{\lambda 1}$) via OPG output port 225-1 to path 151-1. The BPDs 224, 226, 228 may be substantially similar to each other and may each be any device configured to produce an optical parameter (which is generally output in the electrical domain since the BPD are photodetectors) from a pair of different lights. Generally, there is one BPD 224, 226, 228 for each optical parameter that needs to be generated. In addition, in any of the above embodiments any of the BPDs 224, 226, 228 may be replaced with single-ended PDs and a transimpedance amplifier (TIA) may be added following each PD.

Figure 10:
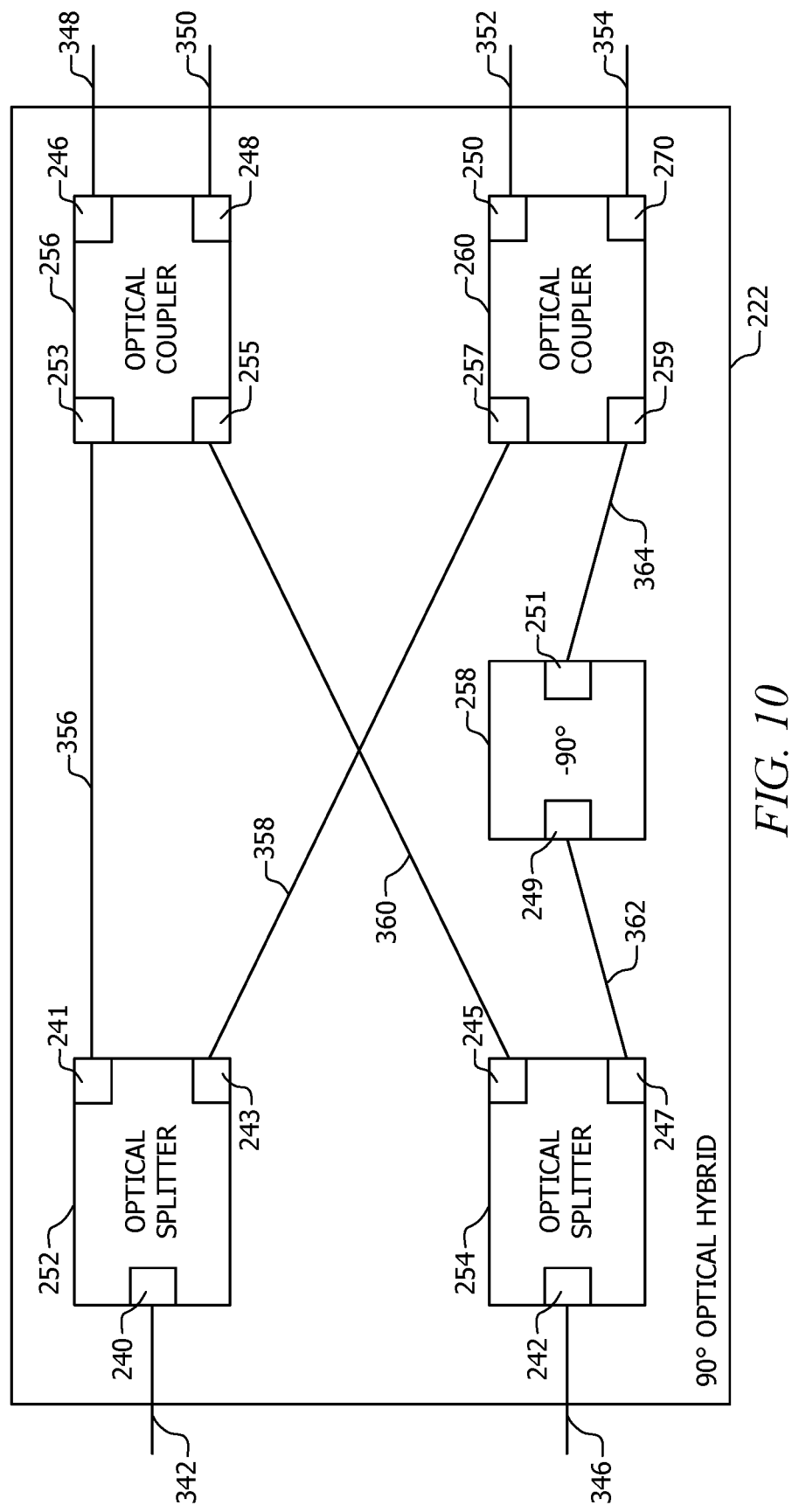
FIG. 10 illustrates a 90° optical hybrid in an embodiment.

The 90° optical hybrid 222 (also called a hybrid mixer) uses the light $E_{x\lambda1(2)}$ on path 342 and the light $E_{y\lambda1(2)}$ on path 346 to produce optical signals used by the BPD 226 and the BPD 228 to produce the second and third optical parameters (e.g. $S2_{\lambda1}$ and $S3_{\lambda1}$). An example of a suitable 90° optical hybrid 222 is shown in FIG. 10. The 90° optical hybrid 222 produces a light $(E_x+E_y)_{\lambda1}$ via output port 346 on path 348 and a light $(E_x-E_y)_{\lambda1}$ via output port 248 on path 350. The BPD 226 is configured to receive the light $(E_x+E_y)_{\lambda1}$ at BPD input port 278 and the light $(E_x-E_y)_{\lambda1}$ at BPD input port 280 and to generate the second optical parameter (e.g. $S2_{\lambda1}$) via OPG output port 227-1 to path 152-1. The 90° optical hybrid 222 also produces a light $(E_x+jE_y)_{\lambda1}$ via output port 250 on path 352 and a light $(E_x-jE_y)_{\lambda1}$ via output port 270 on path 354. The BPD 228 is configured to receive the light $(E_x+jE_y)_{\lambda1}$ on BPD input port 284 and the light $(E_x-jE_y)_{\lambda1}$ on BPD input port 286 to generate the third optical parameter (e.g. $S3_{\lambda1}$) via OPG output port 229-1 to path 153-1. In an embodiment, each optical parameter (e.g. $S1_{\lambda1}$, $S1_{\lambda1}$, and $S1_{\lambda1}$) is fed to a separate ADC 160 (shown in FIG. 1).

It will be further appreciated that the other OPGs 218 (e.g. OPG 218-N) are configured similarly to the OPG 218-1 and hence operate similar to the OPG 218-1. It will also be appreciated that the coupling ratio between the output ports 213, 215, 217, 219 can be varied to achieve similar optical power of the optical signals that arrive at the BPDs 224, 226, 228. If the insertion loss of the 90° optical hybrid 222 is ignored, the optimal coupling ratios for $E_{x\lambda1(1)}/E_{x\lambda1(2)}$ and $E_{y\lambda1(1)}/E_{y\lambda1(2)}$ are around 33.3 percent and 66.7 percent, respectively. It will further be appreciated that the 90° optical hybrid 222 may be replaced by a 2:3 optical coupler where the BPD 226 and the BPD 228 are replaced by three single-feed photodetectors (PDs). In such a case, some circuit operations with simple analog scaling and subtraction may be needed on the outputs of the three single-feed PDs to generate the second optical parameter and the third optical parameter.

FIG. 10 illustrates an embodiment of the 90° optical hybrid 222. The 90° optical hybrid 222 comprises optical splitters 252, 254, a phase shifter 258, and optical couplers 256, 260 coupled together as shown in FIG. 10. The optical splitters 252, 254 may be 1:2 optical splitters or 2:2 optical couplers with one terminated input port, similar to optical splitters 210, 212 described above. The optical couplers 256, 260 may be 2:2 optical couplers that combine two input signals and produce two output signals. The optical splitter 252 receives the light $E_{x\lambda1(2)}$ on path 342 via input port 240 and splits it into a light $E_{x\lambda1(3)}$, which is output via output port 241 to path 356, and a light $E_{x\lambda1(4)}$, which is output via output port 243 to path 358. Similarly, the optical splitter 254 receives the light $E_{y\lambda1(2)}$ on path 346 via input port 242 and splits it into a light $E_{y\lambda1(3)}$, which is output via optical coupler output port 245 to path 360, and a light $E_{y\lambda1(4)}$, which is output via output port 247 to path 362. The optical coupler 256 receives the light $E_{x\lambda1(3)}$ via path 356 and input port 253 and the light $E_{y\lambda1(3)}$ via path 360 and input port 255. The optical coupler 256 combines the light $E_{x\lambda1(3)}$ and the light $E_{y\lambda1(3)}$ to produce the light $(E_x+E_y)_{\lambda1}$ and light $(E_x-E_y)_{\lambda1}$. Light $(E_x+E_y)_{\lambda1}$ is output via output port 246 to path 348, and light $(E_x-E_y)_{\lambda1}$ is output via output port 248 to path 350. Returning to path 362, the phase shifter 258 receives the light $E_{y\lambda1(4)}$ via path 362 and input port 249 and phase shifts the light $E_{y\lambda1(4)}$ (e.g. $-90°$ or $-\pi/2$) to produce a phase-shifted light $E_{y\lambda1(4)PS}$, which is output on output port 251 to path 364. The optical coupler 260 receives the light $E_{x\lambda1(4)}$ at input port 257 and the light $E_{y\lambda1(4)PS}$ at input port 259. The optical coupler 260 also combines the light $E_{x\lambda1(4)}$ and the light $E_{y\lambda1(4)PS}$ to produce the light $(E_x+jE_y)_{\lambda1}$ and light $(E_x-jE_y)_{\lambda1}$. Light $(E_x+jE_y)_{\lambda1}$ is output via output port 250 to path 352, and light $(E_x-jE_y)_{\lambda1}$ is output via output port 270 to path 354.

It will be appreciated that the coupling ratio of the optical splitters 252, 254 and/or the optical couplers 256, 260 may be configured to be around 50:50 such that the optical power of the four optical parameter amplitude signals are approximately the same. It will also be appreciated that the 90° optical hybrid 222 may unitize directional couplers or multimode interference (MMI) couplers.

Figure 11:
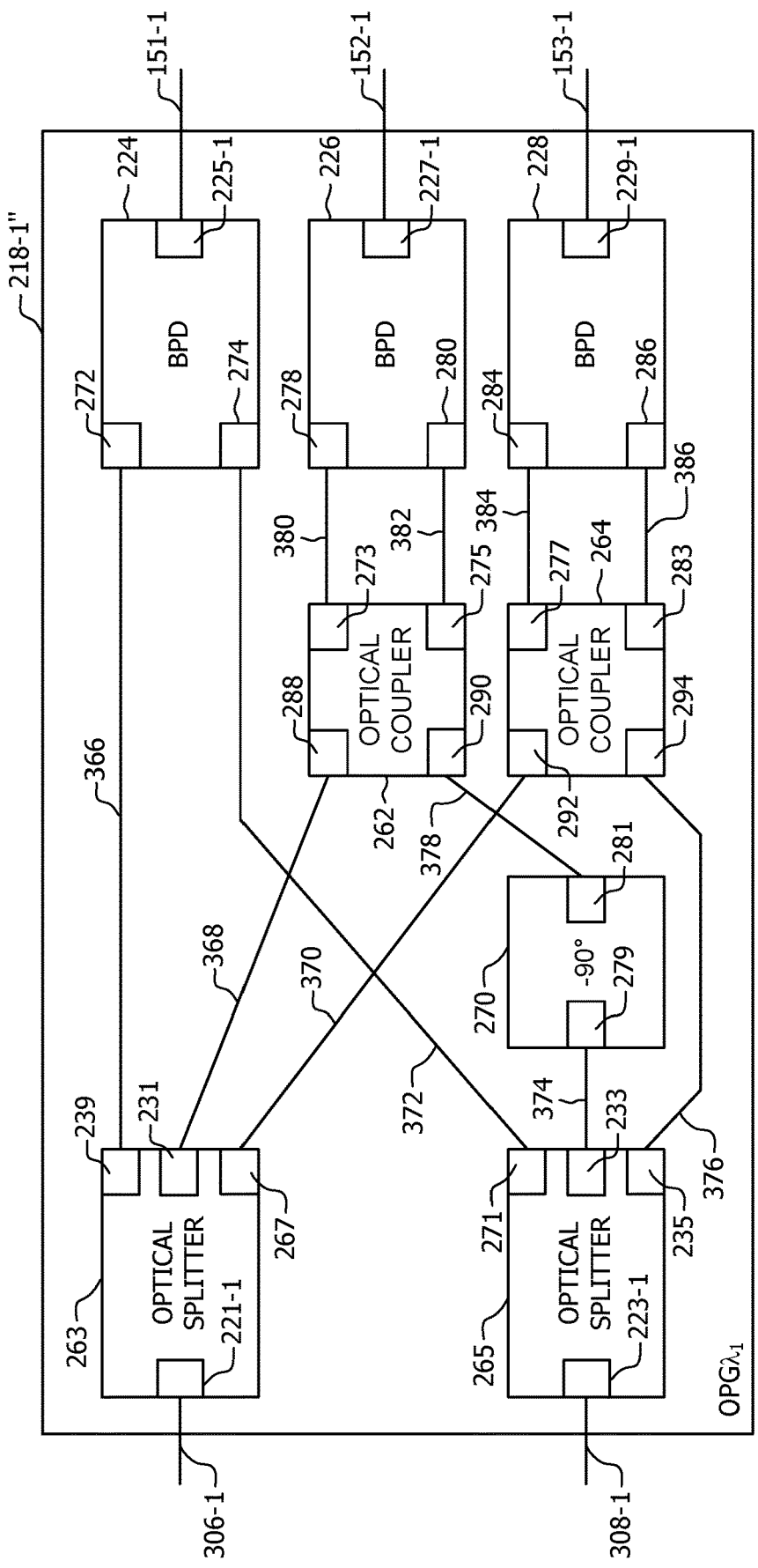
FIG. 11 illustrates the OPG in another embodiment.

FIG. 11 illustrates another embodiment of an OPG 218-1", which is a specific implementation of the OPG 218-1. The OPG 218-1" may comprise a first optical splitter 263, a second optical splitter 265, a phase shifter 270, a first optical coupler 262, a second optical coupler 264, and BPDs 224, 226, 228 coupled together as shown in FIG. 11. The first optical splitter 263 and the second optical splitter 265 may be any optical components configured to split a light into two separate but identical lights. For example, the first optical splitter 263 and the second optical splitter 265 may be 1:3 optical couplers or 3:3 optical couplers with two terminated input ports. In either case, the first optical splitter 263 and the second optical splitter 265 may have an even coupling ratio. The first optical splitter 263 is configured to receive the light $E_{x\lambda1}$ via path 306-1 at OPG input port 221-1 and split the light $E_{x\lambda1}$ into light $E_{x\lambda1(1)}$ (which is output on output port 239 to path 366), light $E_{x\lambda1(2)}$ (which is output on optical splitter output port 231 to path 368), and light $E_{x\lambda1(3)}$ (which is output on optical splitter output port 267 to path 370). Similarly, the second optical splitter 265 is configured to receive the light $E_{y\lambda1}$ via path 308-1 at OPG input port 223-1 and split the light $E_{y\lambda1}$ into light $E_{y\lambda1(1)}$ (which is output on optical splitter output port 271 to path 372), light $E_{y\lambda1(2)}$ (which is output on optical splitter output port 233 to path 374), and light $E_{y\lambda1(3)}$ (which is output on optical splitter output port 235 to path 376).

The phase shifter 270 receives the light $E_{y\lambda1(2)}$ via path 374 and phase shifter input port 279 and phase shifts the light $E_{y\lambda1(2)}$ (e.g. $-90°$ or $-\pi/2$) to produce a phase-shifted light $E_{y\lambda1(2)PS}$, which is output on phase shifter output port 281 to path 378. The first optical coupler 262 receives the light $E_{x\lambda1(2)}$ via path 368 at optical coupler input port 288 and the light $E_{y\lambda1(2)PS}$ via path 378 at optical coupler input port 290. The first optical coupler 262 combines the light $E_{x\lambda1(2)}$ and the light $E_{y\lambda1(2)PS}$ to produce the light $(E_x+E_y)_{\lambda1}$, which is output via optical coupler output port 273 to path 380, and the light $(E_x-E_y)_{\lambda1}$, which is output via optical coupler output port 275 to path 382. Similarly, the second optical coupler 264 receives the light $E_{x\lambda1(3)}$ via path 370 and optical coupler input port 292 and the light $E_{y\lambda1(3)}$ via path 376 and optical coupler input port 294. The second optical coupler 264 combines the light $E_{x\lambda1(3)}$ and the light $E_{y\lambda1(3)}$ to produce the light $(E_x+jE_y)_{\lambda1}$, which is output via optical coupler output port 277 to path 384, and the light $(E_x-jE_y)_{\lambda1}$, which is output via optical coupler output port 283 to path 386. The BPDs 224, 226, 228 may be substantially the same as described above.

In some embodiments, it is beneficial to construct the optical parameter detection receiver 150 in an integrated manner. In such a case, the optical parameter detection receiver 150 is built on a single optical chip, and all of the paths and components illustrated in any of the above embodiments may be based on waveguides instead of fibers and discrete components. In such an embodiment or in other embodiments, the optical path length and/or the optical travel time from the PSR input port 230 to the input ports 272, 274, 278, 280, 284, 286 of the BPDs 224, 226, 228 should be identical or substantially the same. If all of the optical materials have the same refractive indices, then the path lengths would be substantially equal. Otherwise, the optical path lengths from the PSR input port 230 to the input ports 272, 274, 278, 280, 284, 286 can be calculated by multiplying the physical length of each optical path by the refractive index of the material, and summing the result for all of individual paths between the PSR input port 230 to the input ports 272, 274, 278, 280, 284, 286. For example, in a configuration combining the embodiments shown in FIGS. 2, 5, 6, and 11, the optical path length from PSR input port 230 to BPD input port 272 can be calculated by summing the products of the physical path length and the refractive indices for waveguide 318, PSR output port 232, path 302, wavelength separator input port 261, path 322, free propagation region 265, path 324-1, free propagation region 269, path 326-1, wavelength separator output port 205-1, path 306-1, optical splitter 263 (including OPG input port 221-1 and optical splitter output port 239), and path 366. In another example using the same configuration combining the embodiments shown in FIGS. 2, 5, 6, and 11, the optical path length from PSR input port 230 to BPD input port 274 can be calculated by summing the products of the physical path length and the refractive indices for waveguide 320, PSR output port 234, path 304, wavelength separator input port 263, path 322, free propagation region 265, path 324-1, free propagation region 269, path 326-1, wavelength separator output port 207-1, path 308-1, optical splitter 265 (including OPG input port 223-1 and OPG output port 227), and path 372. In some embodiments, it is more practical to measure the light travel time as opposed to the optical path length, and in such embodiments, the optical travel time from the PSR input port 230 to the input ports 221, 223 is identical or substantially the same (e.g. less than a 2 picoseconds delay or skew).

Figure 12:
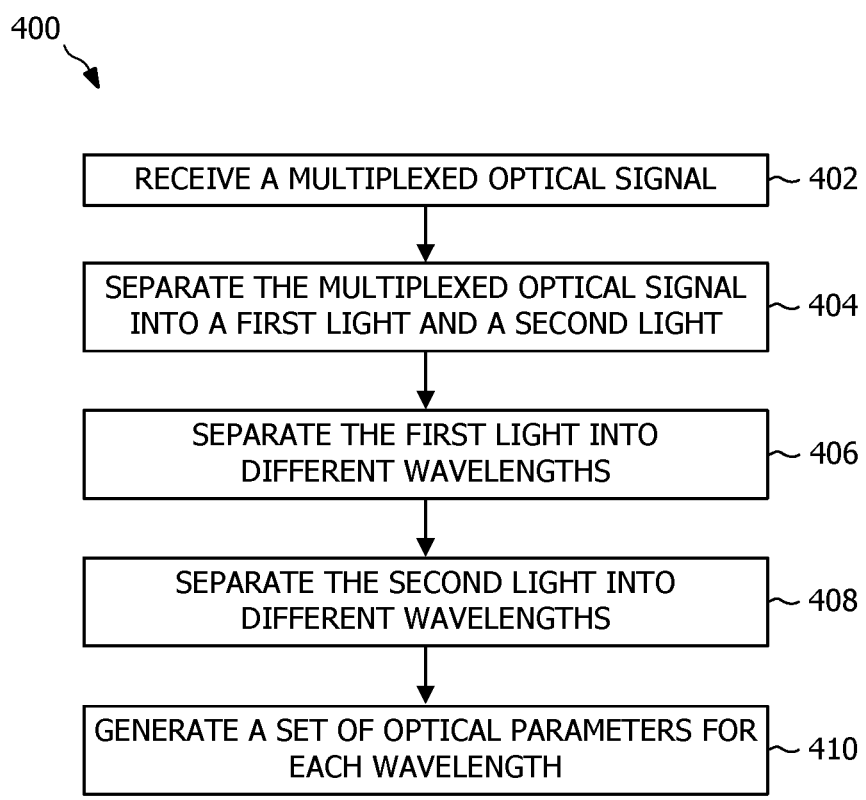
FIG. 12 is a flowchart of a method of detecting optical parameters in an embodiment.

FIG. 12 is a flowchart of an embodiment of a method 400 of detecting optical parameters. In an embodiment, the method 400 is performed by an optical parameter detection receiver 150 whenever a multiplexed optical signal is detected. The method 400 begins at block 602 when a multiplexed optical signal comprising a N optical channel (e.g. λ1-λN) is received. As with the above embodiments, each optical channel is on a separate wavelength, and N is a positive integer greater than or equal to two.

The method 400 continues at block 404 where the multiplexed optical signal is separated into a first light (e.g. $E_x$) and a second light (e.g. $E_y$) each having the same polarization (e.g. TE or TM). Block 404 may be performed by the PSR 201. At block 406, the first light is separated into its different wavelengths. Block 406 may be performed by the first wavelength separator 206. At block 408, the second light is separated into its different wavelengths. Block 408 may be performed by the second wavelength separator 208, and may be performed simultaneously with block 406. At block 410, a set of optical parameters is generated for each wavelength (e.g. $S1_{\lambda 1}$, $S2_{\lambda 1}$, and $S3_{\lambda 1}$ for λ1; . . . $S1_{\lambda N}$, $S2_{\lambda N}$, and $S3_{\lambda N}$ for λN). In an embodiment, block 410 is performed by the OPGs 218-1-218-N.

It will be appreciated that while the method 400 describes the processing for an optical signal comprising N different wavelengths each comprising a data signal polarization and a carrier signal polarization, the present system is not limited to such. For example, method 400 describes the polarization separation occurring before the wavelength separation, but the method 400 can be modified to separate the wavelengths before the polarizations, which would replace the two wavelength division multiplexers with a single wavelength division multiplexer, and replace the single PSR with N PSRs (e.g. one for every wavelength).

Figure 13:
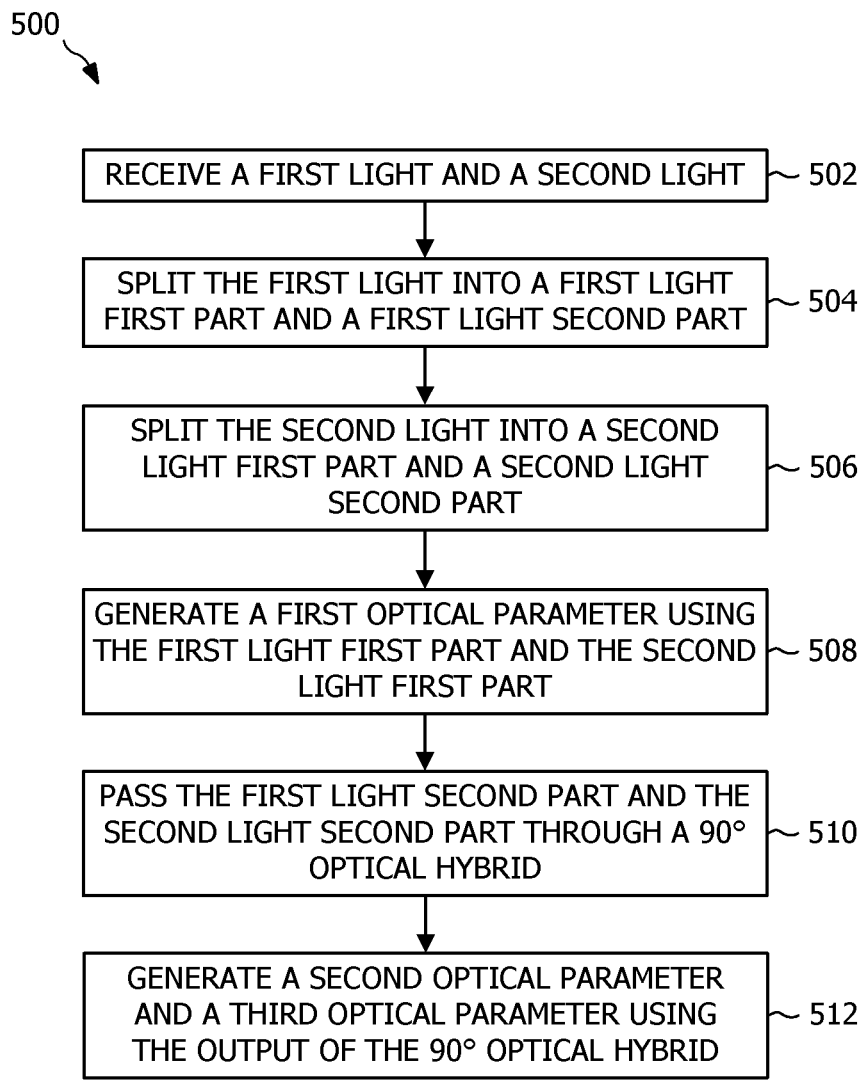
FIG. 13 is a flowchart of a method of generating optical parameters in an embodiment.

FIG. 13 is a flowchart of an embodiment of a method 500 of generating optical parameters, which may correspond to block 410. In an embodiment, the method 500 is performed by an OPG 218 (e.g. OPG 218-1') whenever the lights described herein are detected. At block 502, a first light and a second light are received. The first light may by $E_{x\lambda 1}$ received on path 306-1 and the second light may be $E_{y\lambda 1}$ received on path 308-1. At block 504, the first light is split into a first light first part (e.g. $E_{x\lambda 1(1)}$) and a first light second part (e.g. $E_{x\lambda 1(2)}$). Block 504 may be performed by optical splitter 210. At block 506, the second light is split into a second light first part (e.g. $E_{y\lambda 1(1)}$) and a second light second part (e.g. $E_{y\lambda 1(2)}$). Block 506 may be performed by optical splitter 212, and may be simultaneous with the splitting performed by optical splitter 210. At block 508, the first optical parameter (e.g. $S1_{\lambda 1}$) is generated using the first light first part (e.g. $E_{x\lambda 1(1)}$) and the second light first part (e.g. $E_{y\lambda 1(1)}$). Block 508 may be performed by BPD 224. At block S10, the first light second part (e.g. $E_{x\lambda 1(2)}$) and the second light second part (e.g. $E_{y\lambda 1(2)}$) are passed through a 90° optical hybrid 222. Block S10 may be performed by 90° optical hybrid 222. At block S12, the second optical parameter (e.g. $S2_{\lambda 1}$) and the third optical parameter (e.g. $S3_{\lambda 1}$) are generated using the outputs from the 90° optical hybrid (e.g. $(E_x+E_y)_{\lambda 1}$, $(E_x-E_y)_{\lambda 1}$, $(E_x+jE_y)_{\lambda 1}$, and $(E_x-jE_y)_{\lambda 1}$). Block S12 may be performed by BPDs 226 and 228, and may be simultaneous with the optical parameter generation performed by BPD 224. It will be appreciated that the method 500 is performed for a single wavelength and can be simultaneously repeated for every wavelength to generate the corresponding optical parameters for each wavelength (e.g. $S1_{\lambda 1}$, $S2_{\lambda 1}$, and $S3_{\lambda 1}$ for λ1; . . . $S1_{\lambda N}$, $S2_{\lambda N}$, and $S3_{\lambda N}$ for λN).

Figure 14:
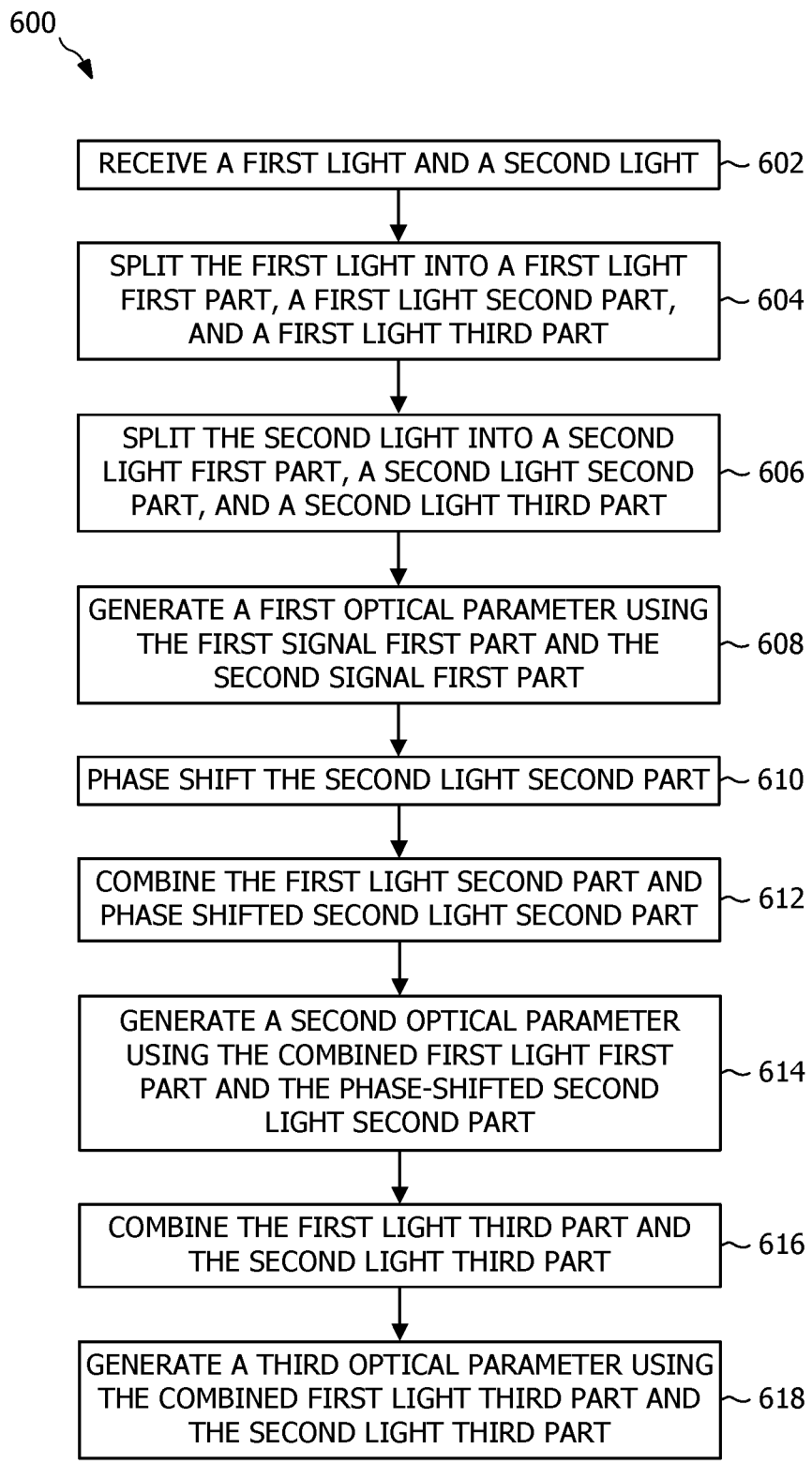
FIG. 14 is a flowchart of the method of generating the optical parameters in another embodiment.

FIG. 14 is a flowchart of another embodiment of a method 600 of generating optical parameters, which may correspond to block 410. In an embodiment, the method 600 is performed by an OPG 218 (e.g. OPG 218-1") whenever the lights described herein are detected. At block 602, a first light and a second light are received. The first light may by $E_{x\lambda 1}$ received on path 306-1 and the second light may be $E_{y\lambda 1}$ received on path 308-1. At block 604, the first light is split into a first light first part (e.g. $E_{x\lambda 1(1)}$), a first light second part (e.g. $E_{x\lambda 1(2)}$), and a first light third part (e.g. $E_{x\lambda 1(3)}$). Block 604 may be performed by optical splitter 263. At block 606, the second light is split into a second light first part (e.g. $E_{y\lambda 1(1)}$), a second light second part (e.g. $E_{y\lambda 1(2)}$), and a second light third part (e.g. $E_{y\lambda 1(3)}$). Block 606 may be performed by optical splitter 265 and may be simultaneous with the splitting performed by optical splitter 263. At block 608, the first optical parameter (e.g. $S1_{\lambda 1}$) is generated using the first light first part (e.g. $E_{x\lambda 1(1)}$) and the second light first part (e.g. $E_{y\lambda 1(1)}$). Block 608 may be performed by BPD 224. At block 610, the second light second part (e.g. $E_{y\lambda 1(2)}$) is phase shifted. Block 610 may be performed by phase shifter 270. At block 612, the first light second part (e.g. $E_{x\lambda1(2)}$) and the phase-shifted second light second part (e.g. $E_{y\lambda1(2)PS}$) may be combined. Block 612 may be performed by optical coupler 262. At block 614, the second optical parameter (e.g. $S2_{\lambda1}$) is generated using the outputs from the action performed in block 612 (e.g. $(E_x+E_y)_{\lambda1}$ and $(E_x-E_y)_{\lambda1}$). Block 614 may be performed by BPD 226 and may be simultaneous with the OPG generation performed by BPD 224. At block 616, the first light third part (e.g. $E_{x\lambda1(3)}$) and the second light third part (e.g. $E_{y\lambda1(3)}$) may be combined. Block 616 may be performed by optical coupler 264 and may be simultaneous with the combination performed by optical coupler 262. At block 618, the third optical parameter (e.g. $S3_{\lambda1}$) is generated using the outputs from the action performed in block 616 (e.g. $(E_x+jE_y)_{\lambda1}$ and $(E_x-jE_y)_{\lambda1}$). Block 618 may be performed by BPD 228 and may be simultaneous with the OPG generation performed by BPDs 224 and/or 226. It will be appreciated that the method 600 is performed for a single wavelength and can be simultaneously repeated for every wavelength to generate the corresponding optical parameters for each wavelength (e.g. $S1_{\lambda1}$, $S2_{\lambda1}$, and $S3_{\lambda1}$ for $\lambda1$; ... $S1_{\lambda N}$, $S2_{\lambda N}$, and $S3_{\lambda N}$ for $\lambda N$).

The disclosed optical parameter detection receiver has many advantages. For example, the disclosed embodiments allow wavelength division multiplexing to be used to increase channels handled by the optical parameter detection receiver (where the prior art receivers only detect one wavelength channel). In addition, the disclosed optical parameter detection receiver shares a PSR for all optical channels (e.g. $\lambda1$-$\lambda N$), which reduces equipment cost. In addition, the disclosed optical parameter detection receiver detects multi-channel optical signals simultaneously, which improves efficiency. Furthermore, integration of multiple channels could further eliminate the discrete wavelength separators and replace such with waveguides. Such is particularly beneficial for 400 gigabit per second (G)/800 G extended reach (ZR) applications that use Stokes vector direct detection. Furthermore, the disclosed optical parameter detection receiver can compensate for chromatic dispersion in a DSP at the receiver, is very tolerant of phase noise, and has no local frequency offset (LOFO).

In one aspect, the disclosure includes a method comprising: means for receiving a multiplexed optical signal comprising optical channels for N wavelengths, N being a positive integer greater than or equal to two; and means for separating the multiplexed optical signal into a first multiplexed light and a second multiplexed light, each of the first multiplexed light and the second multiplexed light having the same polarization, and each of the first multiplexed light and the second multiplexed light having N wavelengths; means for separating the first multiplexed light into a plurality of first lights, each having a different wavelength; separating the second multiplexed light into a plurality of second lights simultaneous with separating the first multiplexed light into the first lights, each of the second lights having a different wavelength; and means for generating optical parameters for each optical channel in the N wavelengths using the first light and the second light for each wavelength. In the above embodiment or any other embodiment, the means for generating the optical parameters for each optical channel in the N wavelengths using the first light and the second light for each wavelength comprises: means for splitting the first light into a first light first part and a first light second part for each wavelength; means for splitting the second light into a second light first part and a second light second part for each wavelength; means for generating a first one of the optical parameters using the first light first part and the second light first part for each wavelength; means for passing the first light second part and the second light second part through a 90° optical hybrid; and means for generating a second one of the optical parameters and a third one of the optical parameters for each optical channel in the N wavelengths using outputs of the 90° optical hybrid. In the above embodiment or any other embodiment, the second one of the optical parameters and the third one of the optical parameters for each optical channel in the N wavelengths is generated simultaneous with generating the first one of the optical parameters. In the above embodiment or any other embodiment, the means for generating the optical parameters for each optical channel in the N wavelengths using the first light and the second light for each wavelength comprises: means for splitting the first light into a first light first part, a first light second part, and a first light third part for each wavelength; means for splitting the second light into a second light first part, a second light second part, and a second light third part for each wavelength; means for generating a first one of the optical parameters using the first light first part and the second light first part for each wavelength; means for phase shifting the second light second part; combining the first light second part and the phase shifted second light second part; means for generating a second one of the optical parameters for each optical channel in the N wavelengths using the combination of the first light second part and the phase shifted second light second part; means for combining the first light third part and the second light third part; and generating a third one of the optical parameters for each optical channel in the N wavelengths using the combination of the first light third part and the second light third part. In the above embodiment or any other embodiment, the second one of the optical parameters and the third one of the optical parameters for each optical channel in the N wavelengths is generated simultaneous with generating the first one of the optical parameters. In the above embodiment or any other embodiment, the means for phase shifting the second light second part comprises means for phase shifting the second light second part −90°. In the above embodiment or any other embodiment, the optical parameters are Stokes parameters S1, S2, and S3.

In a second aspect, the disclosure includes an apparatus comprising: means for receiving a multiplexed optical signal comprising optical channels for N wavelengths, N being a positive integer greater than or equal to two, and separating the multiplexed optical signal into a first multiplexed light and a second multiplexed light, each of the first multiplexed light and the second multiplexed light having the same polarization and each of the first multiplexed light and the second multiplexed light having N wavelengths; means for separating the first multiplexed light into the N separate first lights each having a different wavelength; means for separating the second multiplexed light into the N separate second lights each having a different wavelength; and means for generating optical parameters for the optical channels for the N wavelengths. In the above embodiment or any other embodiment, the various means are all based on waveguides and integrated onto a single optical chip. In the above embodiment or any other embodiment, the means for receiving and separating receives the multiplexed optical signal at a multiplexed optical signal input port, the means for generating optical parameters each comprise at least one means for generating an electrical signal comprising a input port for the first light at each wavelength and a input port for the second light at each wavelength, and a difference in a first light travel time between a time it take the first light to travel from the multiplexed optical signal input port to the input port for the first light and a time it take the second light to travel from the multiplexed optical signal input port to the input port for the second light is no more than 2 picoseconds. In the above embodiment or any other embodiment, the means for generating each comprise: a first means for splitting wavelengths; a second means for splitting wavelengths; a first means for generating an electrical signal; a 90° optical hybrid; a second means for generating an electrical signal; and a third means for generating an electrical signal, and wherein the first means for generating an electrical signal, the second means for generating an electrical signal, and the third means for generating an electrical signal are configured to simultaneously generate the optical parameters for the optical channels for the N wavelengths. In the above embodiment or any other embodiment, the optical parameters are Stokes parameters S1, S2, and S3. In the above embodiment or any other embodiment, the means for generating each comprise: a first means for splitting optical signals; a second means for splitting optical signals; a first means for generating an electrical signal; a means for phase shifting; a first means for optical coupling; a second means for optical coupling; a second means for generating an electrical signal; and a third means for generating an electrical signal, and wherein the first means for generating an electrical signal, the second means for generating an electrical signal, and the third means for generating an electrical signal are configured to simultaneously generate the optical parameters for the optical channels for the N wavelengths. In the above embodiment or any other embodiment, the optical parameters are Stokes parameters S1, S2, and S3.

In a third aspect, the disclosure includes an apparatus comprising: means for receiving and splitting comprising a multiplexed optical signal input port and configured to receive a multiplexed optical signal at the multiplexed optical signal input port, the multiplexed optical signal comprising optical channels for N wavelengths, and N being a positive integer greater than or equal to two; a first means for wavelength separating; a second means for wavelength separating; and a first means for generating optical parameters, the first means for generating optical parameters comprising at least one means for generating an electrical signal comprising a input port for a first light and a input port for a second light, wherein a difference in a first light travel time between a time it take the first light to travel from the multiplexed optical signal input port to the input port for the first light and a time it take the second light to travel from the multiplexed optical signal input port to the input port for the second light is no more than 2 picoseconds. In the above embodiment or any other embodiment, the means for receiving and splitting, the first means for wavelength separating, the second means for wavelength separating, and the N means for generating optical parameters are all based on waveguides and integrated onto a single optical chip. In the above embodiment or any other embodiment, the first means for generating optical parameters comprises: a first means for optical splitting; a second means for optical splitting; a first means for generating an electrical signal; a 90° optical hybrid; a second means for generating an electrical signal; and a third means for generating an electrical signal, and wherein the first means for generating an electrical signal, the second means for generating an electrical signal, and the third means for generating an electrical signal are configured to simultaneously generate the optical parameters for the optical channel for the first wavelength. In the above embodiment or any other embodiment, the first means for generating optical parameters comprises: a first means for optical splitting; a second means for optical splitting; a first means for generating an electrical signal; a means for phase shifting; a first means for optical coupling; a second means for optical coupling; a second means for generating an electrical signal; and a third means for generating an electrical signal, and wherein the first means for generating an electrical signal, the second means for generating an electrical signal, and the third means for generating an electrical signal are configured to simultaneously generate the optical parameters for the optical channels for the N wavelengths. In the above embodiment or any other embodiment, the means for separating wavelengths comprise an arrayed waveguide grating, a micro-ring resonator, or a Mach-Zehnder interferometer. In the above embodiment or any other embodiment, the optical parameters are Stokes parameters.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor, a processor coupled to a memory storing instructions to be executed by the processor, or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving a multiplexed optical signal comprising optical channels for N wavelengths, N being a positive integer greater than or equal to two;
separating the multiplexed optical signal into a first multiplexed light and a second multiplexed light, each of the first multiplexed light and the second multiplexed light having the same polarization, and each of the first multiplexed light and the second multiplexed light having N wavelengths;
separating the first multiplexed light into a plurality of first lights, each having a different wavelength;
separating the second multiplexed light into a plurality of second lights simultaneous with separating the first multiplexed light into the first lights, each of the second lights having a different wavelength; and generating optical parameters for each optical channel in the N wavelengths using the first light and the second light for each wavelength.

2. The method of claim 1, wherein generating the optical parameters for each optical channel in the N wavelengths using the first light and the second light for each wavelength comprises:
splitting the first light into a first light first part and a first light second part for each wavelength;
splitting the second light into a second light first part and a second light second part for each wavelength;
generating a first one of the optical parameters using the first light first part and the second light first part for each wavelength;
passing the first light second part and the second light second part through a 90° optical hybrid; and
generating a second one of the optical parameters and a third one of the optical parameters for each optical channel in the N wavelengths using outputs of the 90° optical hybrid.

3. The method of claim 2, wherein the second one of the optical parameters and the third one of the optical parameters for each optical channel in the N wavelengths is generated simultaneous with generating the first one of the optical parameters.

4. The method of claim 1, wherein generating the optical parameters for each optical channel in the N wavelengths using the first light and the second light for each wavelength comprises:
splitting the first light into a first light first part, a first light second part, and a first light third part for each wavelength;
splitting the second light into a second light first part, a second light second part, and a second light third part for each wavelength;
generating a first one of the optical parameters using the first light first part and the second light first part for each wavelength;
phase shifting the second light second part;
combining the first light second part and the phase shifted second light second part;
generating a second one of the optical parameters for each optical channel in the N wavelengths using the combination of the first light second part and the phase shifted second light second part;
combining the first light third part and the second light third part; and
generating a third one of the optical parameters for each optical channel in the N wavelengths using the combination of the first light third part and the second light third part.

5. The method of claim 4, wherein the second one of the optical parameters and the third one of the optical parameters for each optical channel in the N wavelengths is generated simultaneous with generating the first one of the optical parameters.

6. The method of claim 4, wherein phase shifting the second light second part comprises phase shifting the second light second part −90°.

7. The method of claim 1, wherein the optical parameters are Stokes parameters S1, S2, and S3.

8. An apparatus comprising:
a polarization splitter and rotator (PSR) configured to:
receive a multiplexed optical signal comprising optical channels for N wavelengths, N being a positive integer greater than or equal to two; and
separate the multiplexed optical signal into a first multiplexed light and a second multiplexed light, each of the first multiplexed light and the second multiplexed light having the same polarization and each of the first multiplexed light and the second multiplexed light having N wavelengths;
a first wavelength separator coupled to the PSR and configured to separate the first multiplexed light into the N separate first lights each having a different wavelength;
a second wavelength separator coupled to the PSR in parallel with the first wavelength separator, the second wavelength separator configured to separate the second multiplexed light into the N separate second lights each having a different wavelength; and
N optical parameter generators configured in parallel to the first wavelength separator and the second wavelength separator and configured to generate optical parameters for the optical channels for the N wavelengths.

9. The apparatus of claim 8, wherein the PSR, the first wavelength separator, the second wavelength separator, and the N optical parameter generators are all based on waveguides and integrated onto a single optical chip.

10. The apparatus of claim 8, wherein the PSR receives the multiplexed optical signal at a PSR input port, the N optical parameter generators each comprise at least one balanced photodetector (BPD) comprising a BPD input port for the first light at each wavelength and a BPD input port for the second light at each wavelength, and a difference in a first light travel time between a time it takes the first light to travel from the PSR input port to the BPD input port for the first light and a time it takes the second light to travel from the PSR input port to the BPD input port for the second light is no more than 2 picoseconds.

11. The apparatus of claim 8, wherein the N optical parameter generators each comprise:
a first optical splitter coupled to the first wavelength separator and the second wavelength separator;
a second optical splitter coupled to the first wavelength separator and the second wavelength separator;
a first balanced photodetector (BPD) coupled to the first optical splitter and the second optical splitter;
a 90° optical hybrid coupled to the first optical splitter and the second optical splitter;
a second BPD coupled to the 90° optical hybrid; and
a third BPD coupled to the 90° optical hybrid, and
wherein the first BPD, the second BPD, and the third BPD are configured to simultaneously generate the optical parameters for the optical channels for the N wavelengths.

12. The apparatus of claim 11, wherein the optical parameters are Stokes parameters S1, S2, and S3.

13. The apparatus of claim 8, wherein the N optical parameter generators each comprise:
a first optical splitter coupled to the first wavelength separator and the second wavelength separator;
a second optical splitter coupled to the first wavelength separator and the second wavelength separator;
a first balanced photodetector (BPD) coupled to the first optical splitter and the second optical splitter;
a phase shifter coupled to the second optical splitter;
a first optical coupler coupled to the first optical splitter and the phase shifter;
a second optical coupler coupled to the first optical splitter and the second optical splitter;
a second BPD coupled to the first optical coupler; and a third BPD coupled to the second optical coupler, and wherein the first BPD, the second BPD, and the third BPD are configured to simultaneously generate the optical parameters for the optical channels for the N wavelengths.

14. The apparatus of claim 13, wherein the optical parameters are Stokes parameters S1, S2, and S3.

15. An apparatus comprising:

a polarization splitter and rotator (PSR) comprising a PSR input port configured to receive a multiplexed optical signal, the multiplexed optical signal comprising optical channels for N wavelengths, and N being a positive integer greater than or equal to two;

a first wavelength separator coupled to the PSR;

a second wavelength separator coupled to the PSR in parallel with the first wavelength separator; and a first optical parameter generator coupled to the first wavelength separator and the second wavelength separator and configured to generate optical parameters for a first wavelength, the first optical parameter generator comprising at least one balanced photodetector (BPD) comprising a BPD input port for a first light and a BPD input port for a second light, wherein a difference in a first light travel time between a time it takes the first light to travel from the PSR input port to the BPD input port for the first light and a time it takes the second light to travel from the PSR input port to the BPD input port for the second light is no more than 2 picoseconds.

16. The apparatus of claim 15, wherein the PSR, the first wavelength separator, the second wavelength separator, and the N optical parameter generators are all based on waveguides and integrated onto a single optical chip.

17. The apparatus of claim 15, wherein the first optical parameter generator comprises:

a first optical splitter coupled to the first wavelength separator and the second wavelength separator;

a second optical splitter coupled to the first wavelength separator and the second wavelength separator;

a first BPD coupled to the first optical splitter and the second optical splitter;

a 90° optical hybrid coupled to the first optical splitter and the second optical splitter;

a second BPD coupled to the 90° optical hybrid; and a third BPD coupled to the 90° optical hybrid, and wherein the first BPD, the second BPD, and the third BPD are configured to simultaneously generate the optical parameters for the optical channel for the first wavelength.

18. The apparatus of claim 15, wherein the first optical parameter generator comprises:

a first optical splitter coupled to the first wavelength separator and the second wavelength separator;

a second optical splitter coupled to the first wavelength separator and the second wavelength separator;

a first BPD coupled to the first optical splitter and the second optical splitter;

a phase shiner coupled to the second optical splitter;

a first optical coupler coupled to the first optical splitter and the phase shifter;

a second optical coupler coupled to the first optical splitter and the second optical splitter;

a second BPD coupled to the first optical coupler; and a third BPD coupled to the second optical coupler, and wherein the first BPD, the second BPD, and the third BPD are configured to simultaneously generate the optical parameters for the optical channels for the N wavelengths.

19. The apparatus of claim 15, wherein the first wavelength separator and the second wavelength separator each comprise an arrayed waveguide grating, a micro-ring resonator, or a Mach-Zehnder interferometer.

20. The apparatus of claim 15, wherein the optical parameters are Stokes parameters.

* * * * *

UNITED STATES PATENT AND TRADEMARK OFFICE
CERTIFICATE OF CORRECTION

PATENT NO. : 11,405,112 B2
APPLICATION NO. : 15/856803
DATED : August 2, 2022
INVENTOR(S) : Yangjing Wen et al.

It is certified that error appears in the above-identified patent and that said Letters Patent is hereby corrected as shown below:

In the Claims

Column 22, Claim 18, Lines 12-30, should read as:
18. The apparatus of claim 15, wherein the first optical parameter generator comprises:
    a first optical splitter coupled to the first wavelength separator and the second wavelength separator;
    a second optical splitter coupled to the first wavelength separator and the second wavelength separator;
    a first BPD coupled to the first optical splitter and the second optical splitter;
    a phase shifter coupled to the second optical splitter;
    a first optical coupler coupled to the first optical splitter and the phase shifter;
    a second optical coupler coupled to the first optical splitter and the second optical splitter;
    a second BPD coupled to the first optical coupler; and
    a third BPD coupled to the second optical coupler, and
    wherein the first BPD, the second BPD, and the third BPD are configured to simultaneously generate the optical parameters for the optical channels for the N wavelengths.

Signed and Sealed this
Fourth Day of October, 2022

Katherine Kelly Vidal
*Director of the United States Patent and Trademark Office*